US012751449B2

(12) United States Patent
Berg et al.

(10) Patent No.: US 12,751,449 B2
(45) Date of Patent: *Oct. 6, 2026

(54) LIQUID ANTI-PATHOGENIC AGRICULTURAL COMPOSITION

(71) Applicant: ORO AGRI INC., Fresno, CA (US)

(72) Inventors: Paulo Sergio Berg, Londrina (BR); Melvin Donovan Pullen, Burbank, CA (US); Dirk Barnard, Clovis, CA (US); Jared Vanderzyl, Clovis, CA (US)

(73) Assignee: ORO AGRI INC., Fresno, CA (US)

( * ) Notice: Subject to any disclaimer, the term of this patent is extended or adjusted under 35 U.S.C. 154(b) by 1020 days.

This patent is subject to a terminal disclaimer.

(21) Appl. No.: 17/309,953

(22) PCT Filed: Jan. 8, 2020

(86) PCT No.: PCT/IB2020/050125

§ 371 (c)(1),
(2) Date: Jul. 2, 2021

(87) PCT Pub. No.: WO2020/144599

PCT Pub. Date: Jul. 16, 2020

(65) Prior Publication Data

US 2023/0172200 A1 Jun. 8, 2023

Related U.S. Application Data

(60) Provisional application No. 62/789,649, filed on Jan. 8, 2019, provisional application No. 62/789,657, filed on Jan. 8, 2019, provisional application No. 62/789,656, filed on Jan. 8, 2019.

(51) Int. Cl.

| | |
|---|---|
| ***A01N 37/06*** | (2006.01) |
| ***A01N 25/04*** | (2006.01) |
| ***A01N 37/02*** | (2006.01) |
| ***A01N 37/04*** | (2006.01) |
| ***A01P 3/00*** | (2006.01) |

(52) U.S. Cl.

CPC ............. *A01N 37/06* (2013.01); *A01N 25/04* (2013.01); *A01N 37/02* (2013.01); *A01N 37/04* (2013.01); *A01P 3/00* (2021.08)

(58) Field of Classification Search

CPC combination set(s) only.
See application file for complete search history.

(56) References Cited

U.S. PATENT DOCUMENTS

| | | | | |
|---|---|---|---|---|
| 3,798,020 | A * | 3/1974 | Parham, Jr. .............. | C05D 9/02 71/64.1 |
| 4,363,756 | A | 12/1982 | Sepulveda et al. | |
| 4,772,427 | A | 9/1988 | Dawson et al. | |
| 2006/0183641 | A1 | 8/2006 | Otsubo et al. | |
| 2007/0179077 | A1* | 8/2007 | Formstone ............. | A01N 25/02 510/405 |
| 2007/0190094 | A1 | 8/2007 | Bessette | |
| 2008/0214400 | A1* | 9/2008 | Pullen .................. | A61K 36/752 514/762 |
| 2010/0160168 | A1* | 6/2010 | Lindner ................. | A01N 25/02 504/362 |
| 2012/0135910 | A1 | 5/2012 | Gross et al. | |
| 2017/0094965 | A1 | 4/2017 | Ravier et al. | |
| 2023/0157280 | A1* | 5/2023 | Berg ...................... | A01N 37/02 504/313 |

FOREIGN PATENT DOCUMENTS

| | | | |
|---|---|---|---|
| CN | 1267188 | A | 9/2000 |
| CN | 101353860 | A | 1/2009 |
| CN | 101692811 | A | 4/2010 |
| CN | 101912381 | A | 12/2010 |
| CN | 107699906 | A | 2/2018 |
| CN | 113543636 | A | 10/2021 |
| CN | 104872114 | A | 7/2022 |
| EP | 2441824 | A1 | 4/2012 |
| JP | H 06-219901 | A | 8/1994 |
| JP | 1998-130103 | A | 5/1998 |

(Continued)

OTHER PUBLICATIONS

Virginia Cooperative Extension "Precision Farming . . . " Publication 442-505, https://vtechworks.lib.vt.edu/server/api/core/bitstreams/9df8cff9-74f8-4826-8d5e-700e302ee2ee/content, p. 1-16, produced 2011. (Year: 2011).*
CanolaWatch; "Tank Mixes . . . " May 30, 2018, no pagination; (https://www.canolacouncil.org/canola-watch/2018/05/30/tank-mixes-of-herbicides-and-insecticides/#:~:text=Add%20any%20wettable%20powders%2C%20water,sure%20they're%20well%20mixed.).*
British Columbia (Ministry of Agri., published Dec. 2015).*
Grzmil et al. (Industrial & Engineering Chem. Res., 2001, 41(2), 139-144).*
Examination Report issued in Australian Patent Application No. 2020205488, dated Jul. 5, 2022.
Examination Report issued in Indian Patent Application No. 202117032996, dated Nov. 12, 2021.
Office Action issued in Chinese Patent Application No. 202080019461.7, dated Jun. 16, 2022.
Response to Official Communication pursuant to Rules 161(1) and 162 EPC in European Patent Application No. 20701886.2, dated Apr. 7, 2022.

(Continued)

*Primary Examiner* — Erin E Hirt
(74) *Attorney, Agent, or Firm* — Knobbe, Martens, Olson & Bear, LLP

(57) ABSTRACT

A stable, safe and synergistic liquid anti-pathogenic agricultural composition for use as an insecticide, fungicide, nematicide and/or miticide which has a high flash point and an epicuticular wax compatibility. The composition is typically used in foliar applications and/or in irrigation systems. The composition includes at least one alkyl ($C_1$-$C_8$) ester of an alkyl ($C_{12}$-$C_{16}$) acid; at least one anionic surfactant; and at least one nonionic surfactant. A method of preparing one or more anti-pathogenic compositions, and use of the same as a treatment to control pathogens (in diluted form) applied to crops, trees, fruits, vegetables, leaves, stems, roots, seeds, flowers, animals, equipment, stockyards, feedlots, barns, animal housing units, farm buildings or storage areas.

5 Claims, 8 Drawing Sheets

(56) References Cited

FOREIGN PATENT DOCUMENTS

| | | | |
|---|---|---|---|
| JP | 2006-117538 | A | 5/2006 |
| JP | 2006-241135 | A | 9/2006 |
| JP | 2007-520448 | A | 7/2007 |
| WO | WO 94/10975 | | 5/1994 |
| WO | WO 99/003343 | | 1/1999 |
| WO | WO 03/092583 | A2 | 11/2003 |
| WO | WO 2008/062428 | A2 | 5/2008 |
| WO | WO 2015/004194 | A1 | 1/2015 |
| WO | WO 2016/202572 | A1 | 12/2016 |
| WO | WO 2020/144599 | A1 | 7/2020 |

OTHER PUBLICATIONS

Choi et al. "Antifungal Activity of Lower Alkyl Fatty Acid Esters against Powdery Mildews". Article, The Plant Pathology Journal, Nov. 19, 2010, pp. 360-366.

Skelton et al. "Pesticide Macroemulsion Concentrate Formulations Utilizing Patty Acid Methyl Esters As Solvent Alternatives". Pesticide Formulations and Application Systems: 13$^{th}$ Volume. American Society for Testing and Materials, Philadelphia, 1993.

* cited by examiner

LIQUID ANTI-PATHOGENIC AGRICULTURAL COMPOSITION

This application is a U.S. National Phase under 35 U.S.C. § 371 of International Application PCT/IB2020/050125, filed Jan. 8, 2020, designating the U.S., and published in English as WO 2020/144599 on Jul. 16, 2020, which claims priority to U.S. Provisional Application Nos. 62/789,649; US 62/789,656; and 62/789,657, all filed Jan. 8, 2019, the entire contents of which are incorporated herein by reference.

FIELD OF THE DISCLOSURE

This disclosure relates to an anti-pathogenic agricultural composition, preferably a liquid which may be provided in a concentrate or diluted form. Particularly this disclosure relates to a liquid anti-pathogenic agricultural composition having a flashpoint greater than about 100° C. The composition typically comprises an at least one alkyl ($C_1$-$C_8$) ester of an alkyl ($C_{12}$-$C_{16}$) acid, an anionic surfactant and a nonionic surfactant, wherein the at least one alkyl ($C_1$-$C_8$) ester of an alkyl ($C_{12}$-$C_{16}$) acid safe for human and/or animal use.

BACKGROUND OF THE DISCLOSURE

Commercial farming of both plant crops and livestock may be very susceptible to disease causing pathogens, which when left uncontrolled may provide for food insecurity (by destroying crops and/or livestock) and/or pose a health risk to consumers. Pathogens may be microorganisms and may typically include, but are not limited to, fungi, bacteria, and viruses. Pathogens often proliferate due to unsuitable agricultural and/or animal husbandry practices and/or due to environmental factors such as high temperature and humidity that promote fast microorganism reproduction. Providing effective control of pathogens in agriculture and animal husbandry is imperative to ensure ongoing food security. Effective control of pathogens has been hampered by increased resistance to usual control measures or treatments using conventional bactericides or fungicides. Such bactericidal and/or fungicidal resistance poses a significant problem in the control and/or treatment and/or removal of pathogens from agricultural produce.

Similarly, insects and/or other pests often provide for significant problems and/or health risk due to improper farming practices. Some insects and/or pests have also been known to migrate from wild environments to cultivated land, and moreover typical control means have been hampered by resistance developed from genetic mutation. Within a cultivated landscape these insects and/or other pests often have no natural enemies and controlling their population is a difficult challenge.

In recent years, there has also been a move toward providing environmentally friendly agricultural compositions that may control and/or treat and/or reduce and/or remove pathogen populations from plant crops and animals. Consumers have become more conscious about purchasing food goods that have been grown, cultivated or produced in an environmentally friendly manner typically utilizing organic and/or biodegradable and/or human and animal safe products. As such, farmers and the agrochemicals sector have needed to develop environmentally friendly agricultural compositions that are stable and provide anti-pathogenic properties when administered to a seed and/or plant and/or an animal, or part thereof.

There remains a need to provide for new and innovative agricultural compositions to control pathogen populations, and/or there remains a need to control and/or treat disease caused by said pathogens. Broadly, there remains a need to at least ameliorate disadvantages known in the prior art.

SUMMARY OF THE DISCLOSURE

Broadly, and in accordance with a first aspect of this disclosure there is provided a liquid anti-pathogenic agricultural composition comprising:

at least one ($C_1$-$C_8$) alkyl ester of an ($C_{12}$-$C_{16}$) alkyl acid;
at least one anionic surfactant; and
at least one nonionic surfactant.

wherein the liquid agricultural anti-pathogenic composition has a flash point higher than about 100° C.; and wherein the at least one alkyl ($C_1$-$C_8$) esters of alkyl ($C_{12}$-$C_{16}$) acid has a paraffinic wax dissolution capability of between about 2 wt. % to about 20 wt. % at 25° C.

The anti-pathogenic agricultural composition may provide a fungicide, bactericide, insecticide, miticide, nematicide, pesticide or a combination thereof. Typically, the anti-pathogenic agricultural composition may provide a fungicide and insecticide. The pathogens may include, but are not limited to, the group comprising: *Aspergillus niger, Botrytis cinereal, Colletotrichum fioriniae, Fusarium moniliforme, Fusarium oxysporum, Macrophomina phaseolina, Verticillium dahlia*, and *Xanthomonas arboricola pv. Juglandis.*

It is to be understood that the anti-pathogenic agricultural composition may be in a concentrate form providing a liquid concentrate anti-pathogenic agricultural composition. The liquid concentrate anti-pathogenic agricultural composition may be diluted with water and/or other solvents to provide a diluted liquid anti-pathogenic agricultural composition. The liquid concentrate anti-pathogenic agricultural composition may be formulated as an emulsifiable or microemulsified concentrate.

The term "microemulsified" as used herein, refers to a dispersion made of water and/or oil and/or surfactant(s) that is an isotropic and thermodynamically stable system. The liquid concentrate anti-pathogenic agricultural composition (preferably the liquid concentrate fungicidal and insecticidal agricultural composition) may be diluted for use in water or other chemistries, e.g., solutions of water, glycols and alcohol or other water-miscible liquids, e.g., methanol, ethanol, monoethylene glycol, propylene glycol, or the like, therein providing for the diluted liquid anti-pathogenic agricultural composition.

The at least one alkyl ($C_1$-$C_8$) ester of an alkyl ($C_{12}$-$C_{16}$) acid may be selected from, but not limited to, the group comprising: a natural or synthetic, linear or branched, saturated or unsaturated, modified or unmodified, wherein the alkyl ester may be a compound selected from, but not limited to, the group: methyl esters, ethyl esters, propyl esters, butyl esters, isopropyl ester, isobutyl ester, isopentyl ester, 2-ethylhexyl esters or components or combinations thereof.

The at least one alkyl ($C_1$-$C_8$) ester of an alkyl ($C_{12}$-$C_{16}$) acid may be derived from an alkyl acid selected from, but not limited to, the group comprising: lauric acid, tridecylic acid, myristic acid, pentadecanoic acid, palmitic acid, and combinations thereof.

The at least one alkyl ($C_1$-$C_8$) ester of an alkyl ($C_{12}$-$C_{16}$) acid may be selected from, but not limited to, the group comprising: isobutyl laurate, isopentyl laurate, methyl laurate, 2-ethylhexyl laurate, 2-ethylhexyl palmitate, isopropyl laurate, isopropyl myristate, isopropyl palmitate, and combinations thereof. In a preferred embodiment the at least one alkyl ($C_1$-$C_8$) ester of an alkyl ($C_{12}$-$C_{16}$) acid may be isopropyl myristate and/or isopropyl laurate.

The at least one anionic surfactant may be selected from, but not limited to, the group comprising: ($C_6$-$C_{18}$) alkyl benzene sulfonic acid salts, calcium dodecylbenzene sulfonate, sodium dodecylbenzene sulfonate, amine ($C_6$-$C_{18}$) alkyl benzene sulfonate, triethanolamine dodecylbenzene sulfonates, ($C_6$-$C_{18}$) alkyl ether sulfates, ($C_6$-$C_{18}$) alkyl ethoxylated ether sulfates, ($C_6$-$C_{18}$) alkyl sulfates, lauryl ether polyethoxylated sodium sulfate, ($C_6$-$C_{18}$) alkyl phosphate esters, ($C_6$-$C_{18}$) alkoxylated sulfates, ($C_6$-$C_{18}$) alkoxylated phosphate esters, xylene sulfonate salts, cumene sulfonate salts, and combinations thereof.

The at least one nonionic surfactant may be selected from, but not limited to, the group comprising: natural and/or synthetic ($C_8$-$C_{22}$) alkoxylated fatty alcohols, ($C_8$-$C_{22}$) ethoxylated fatty alcohols, ($C_8$-$C_{22}$) propoxylated fatty alcohols, ($C_8$-$C_{22}$) ethoxylated and propoxylated fatty alcohols, straight chain ($C_4$-$C_{10}$) alkyl(poly)glycosides, branched chain ($C_4$-$C_{10}$) alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof.

The ethoxylated fatty alcohols of fatty acids may have a degree of ethoxylation of from 1 to 50, more preferably 2 to 30, most preferably 3 to 10.

Some alkoxylated alcohols contemplated for use include those based on branched alcohols, such as the Guerbet alcohols, e.g. 2-propylheptanol and 2-ethylhexanol, and $C_{10}$— OXO-alcohol or $C_{13}$ OXO-alcohol, i.e. an alcohol mixture whose main component is formed by at least one branched $C_{10}$-alcohol or $C_{13}$-alcohol, and the alcohols commercially available as Exxal alcohols from Exxon Mobile Chemicals and Neodol alcohols from Shell Chemicals.

The liquid concentrate anti-pathogenic agricultural composition may may further comprise an additive selected from, but not limited to, the group comprising: preservatives, clarifiers, anti-freezing agents, hydrotropes, stabilizers, antioxidants, acidifiers, chelates, complexing agents, dyes, rheology modifiers, antifoams, anti-drift and water, oil, terpene, terpene containing oil, or other solvents, and combinations thereof.

In certain embodiments of the liquid concentrate anti-pathogenic agricultural composition (preferably the liquid concentrate fungicidal and insecticidal agricultural composition), the at least one alkyl ($C_1$-$C_8$) ester of an alkyl ($C_{12}$-$C_{16}$) acid may be present in an amount of between about 0.1 wt. % to about 30 wt. %, the at least one anionic surfactant may be present in an amount of between about 1 wt. % to about 50 wt. %, and the at least one nonionic surfactant may be present in an amount of between about 1 wt. % to about 50 wt. %. It is to be understood that the liquid concentrate anti-pathogenic agricultural composition may further be diluted with water or other solvents to provide the diluted liquid anti-pathogenic agricultural composition.

In other embodiments of the liquid concentrate anti-pathogenic agricultural composition (preferably the liquid concentrate fungicidal and insecticidal agricultural composition), the at least one alkyl ($C_1$-$C_8$) ester of an alkyl ($C_{12}$-$C_{16}$) acid may be present in an amount of between about 0.1 wt. % to about 20 wt. %, preferably between about 2 wt. % to about 15 wt. %, the at least one anionic surfactants may be present in an amount of between about 3 wt. % to about 20 wt. %, and wherein the at least one nonionic surfactant is present in an amount of between about 5 wt. % to about 30 wt. %. It is to be understood that the liquid concentrate anti-pathogenic agricultural composition may further be diluted with water or other solvents to provide the diluted liquid anti-pathogenic agricultural composition.

The liquid concentrate anti-pathogenic agricultural composition (preferably the liquid concentrate fungicidal and insecticidal agricultural composition) may further comprise water and/or other additives, typically such that the liquid agricultural fungicidal and insecticidal may comprise from about 0.1 to about 20 wt. % of the at least one alkyl ($C_1$-$C_8$) ester of an alkyl ($C_{12}$-$C_{16}$) acid; and from about 1 to about 50 wt. % of the at least one anionic surfactant, and from about 1 to about 50 wt. % of the at least one nonionic surfactant, and from about 2 to about 80 wt. % of the water and/or other additives. This embodiment may still be the concentrate form of the composition. Further dilution with water or other chemistries may provide the diluted liquid anti-pathogenic agricultural composition.

In an example embodiment of the disclosure there is provided a liquid concentrate fungicidal and insecticidal agricultural composition comprising at least one alkyl ($C_1$-$C_8$) ester of an alkyl ($C_{12}$-$C_{16}$) acid present in an amount of between about 0.1 wt. % to about 30 wt. %, preferably between about 2 wt. % to about 15 wt. %; an at least one anionic surfactant present in an amount of between about 3 wt. % to about 20 wt. %; and an at least one nonionic surfactant present in an amount of between about 5 wt. % to about 30 wt. %; and wherein the at least one alkyl ($C_1$-$C_8$) ester of an alkyl ($C_{12}$-$C_{16}$) acid is selected from, but not limited to, the group comprising: isobutyl laurate, isopentyl laurate, methyl laurate, 2-ethylhexyl laurate, 2-ethylhexyl palmitate, isopropyl laurate, isopropyl myristate, isopropyl palmitate, and combinations thereof; and wherein the at least one anionic surfactant is selected from, but not limited to, the group comprising: ($C_6$-$C_{18}$) alkyl benzene sulfonic acid salts, calcium dodecylbenzene sulfonate, sodium dodecylbenzene sulfonate, amine ($C_6$-$C_{18}$) alkyl benzene sulfonate, triethanolamine dodecylbenzene sulfonates, ($C_6$-$C_{18}$) alkyl ether sulfates, ($C_6$-$C_{18}$) alkyl ethoxylated ether sulfates, ($C_6$-$C_{18}$) alkyl sulfates, lauryl ether polyethoxylated sodium sulfate, ($C_6$-$C_{18}$) alkyl phosphate esters, ($C_6$-$C_{18}$) alkoxylated sulfates, ($C_6$-$C_{18}$) alkoxylated phosphate esters, xylene sulfonate salts, cumene sulfonate salts, and combinations thereof; and wherein the at least one nonionic surfactant is selected from, but not limited to, the group comprising: ($C_8$-$C_{22}$) alkoxylated fatty alcohols, ($C_8$-$C_{22}$) ethoxylated fatty alcohols, ($C_8$-$C_{22}$) propoxylated fatty alcohols, ($C_8$-$C_{22}$) ethoxylated and propoxylated fatty alcohols, straight chain ($C_4$-$C_{10}$) alkyl(poly)glycosides, branched chain ($C_4$-$C_{10}$) alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof.

The example embodiment of the disclosure may further comprise water as a diluent and/or other additives, such that the composition comprises from about 0.1 wt. % to about 20 wt. % of the at least one alkyl ($C_1$-$C_8$) ester of an alkyl ($C_{12}$-$C_{16}$) acid; and about 1 wt. % to about 50 wt. % of the at least one anionic surfactant, and about 1 wt. % to about 50 wt. % of the at least one nonionic surfactant, and about 2 wt. % to about 80 wt. % of the water and/or other additives. This embodiment may still be the concentrate form of the composition. Further dilution with water or other chemistries may provide the diluted liquid anti-pathogenic agricultural composition.

The additives may be at least one selected from, but not limited to, the group comprising: preservatives, clarifiers, anti-freezing agents, hydrotropes, stabilizers, antioxidants, acidifiers, chelates, complexing agents, dyes, rheology modifiers, antifoams, anti-drift and water, oil or other solvents, and combinations thereof.

The oil may be a natural compound, modified by esterification or transesterification, such as an alkyl fatty acid ester, e.g., methyl esters, ethyl esters, propyl esters, butyl esters, 2-ethylhexyl esters or dodecyl esters, and is preferably a glycol or glycerol fatty acid, such as ($C_{10}$-$C_{22}$) fatty acid esters, such as from vegetables oils, preferably oil-yielding plants species such as soybean, corn, sunflower, rapeseed oil, cottonseed oil, linseed oil, palm oil, safflower, coconut oil, castor oil, olive oil, canola oil among others pure or mixed with an essential or edible oil extracted from a variety of plants or parts of plants such as trees, shrubs, leaves, flowers, grasses, fluids, herbs, fruits and seeds, or mixed with each other that are combined with one or more oils.

The liquid concentrate anti-pathogenic agricultural composition may have a flash point over about 100° C. measured in a closed cup device, and wherein the at least one alkyl ($C_1$-$C_8$) ester of an alkyl ($C_{12}$-$C_{16}$) acid may have a paraffinic wax (CAS number 8002-74-2) dissolution capability of at least 2 wt. % at 25° C., and wherein the emulsifiable or microemulsified liquid concentrate anti-pathogenic agricultural composition may be diluted to be applied in tank mixes or irrigation system mixed with water or other chemistries at a rate of 1:5000 to 1:10, therein providing a diluted liquid anti-pathogenic agricultural composition to be applied via air assisted sprayers, conventional sprayers, ultra-low volumes equipment such as aerial, electrostatic, foggers and misting spray equipment and chemigation systems such as pivots an sprinklers.

The liquid concentrate anti-pathogenic agricultural composition according to the first aspect of this disclosure provides for a stable emulsifiable or microemulsified liquid, with a high flash point (greater than about 100° C.) and an epicuticular wax compatibility that promotes bio-efficacy for use with industrial, turf, ornamental, horticultural and agricultural fields of endeavor. The anti-pathogenic composition is safe for human and/or animals. The liquid concentrate anti-pathogenic agricultural composition provides improvement of penetration of an active ingredients (including additionally fungicidal and insecticidal) through the epicuticular of a target crop or pest when in use, particularly as the diluted liquid anti-pathogenic agricultural composition. It is the unique chemical formulation of this disclosure that provides for a stable emulsifiable or microemulsifiable liquid which is advantageous to end users when applied or used.

In accordance with a second aspect of this disclosure there is provided a method of diluting a liquid anti-pathogenic agricultural composition according to the first aspect of this disclosure, the method comprising:

diluting the liquid concentrate anti-pathogenic agricultural composition according to the first aspect of the disclosure above with water at a ratio by weight of liquid concentrate anti-pathogenic agricultural composition to water from about 1:5000 to about 1:10 to yield a diluted liquid anti-pathogenic agricultural composition. The diluted liquid anti-pathogenic agricultural composition may be provided as a stable diluted emulsion and/or microemulsion. It is to be understood that the water may further contain at least one agricultural chemical compounds selected from, but not limited to, the group comprising: adjuvants, insecticides, fungicides, acaricides, nutrients, miticides, bactericides, biocides, ovicides, nematicides, insect growth regulators, plant grow regulators and combinations thereof.

In accordance with a third aspect of this disclosure there is provided the liquid anti-pathogenic agricultural composition (in concentrate form and/or diluted form) of the first aspect of this disclosure described herein above for use in the control of pathogens and/or in the treatment of disease caused by said pathogens.

In accordance with a fourth aspect of this disclosure there is provided a method of controlling and/or treating pathogens and/or a method of treating disease caused by said pathogens, the method comprising the steps of applying the liquid anti-pathogenic agricultural composition of the first aspect of this disclosure described herein above onto, or adjacent to, a plant or seed.

The method wherein the liquid anti-pathogenic agricultural composition is the liquid concentrate anti-pathogenic agricultural composition and may be diluted in a at least one of, but not limited to, the following group: a mixing tank, a spray tank, a container, or an inline irrigation system, therein providing the diluted liquid anti-pathogenic agricultural composition which may be a stable diluted emulsion or microemulsion that facilitates rain-fastness through accelerated uptake into the plant or interaction with insects or fungi or other pathogens that cause diseases owing to for example wax dissolution capability of the adjuvant.

The method wherein the stable diluted emulsion and/or microemulsion may be applied on at least one member of, but not limited to, the group comprising: plants, weeds, seeds, soil, urban places, and forests, via an apparatus selected from, but not limited to, the group comprising: air assisted sprayers, conventional sprayers, ultra-low volumes equipment such as aerial, electrostatic, foggers and misting spray equipment and chemigation systems, pivots, sprinklers, and combinations thereof. The disclosure extends to uses of the liquid agricultural fungicidal and insecticidal.

DETAILED DESCRIPTION OF DISCLOSURE

Figure 1:
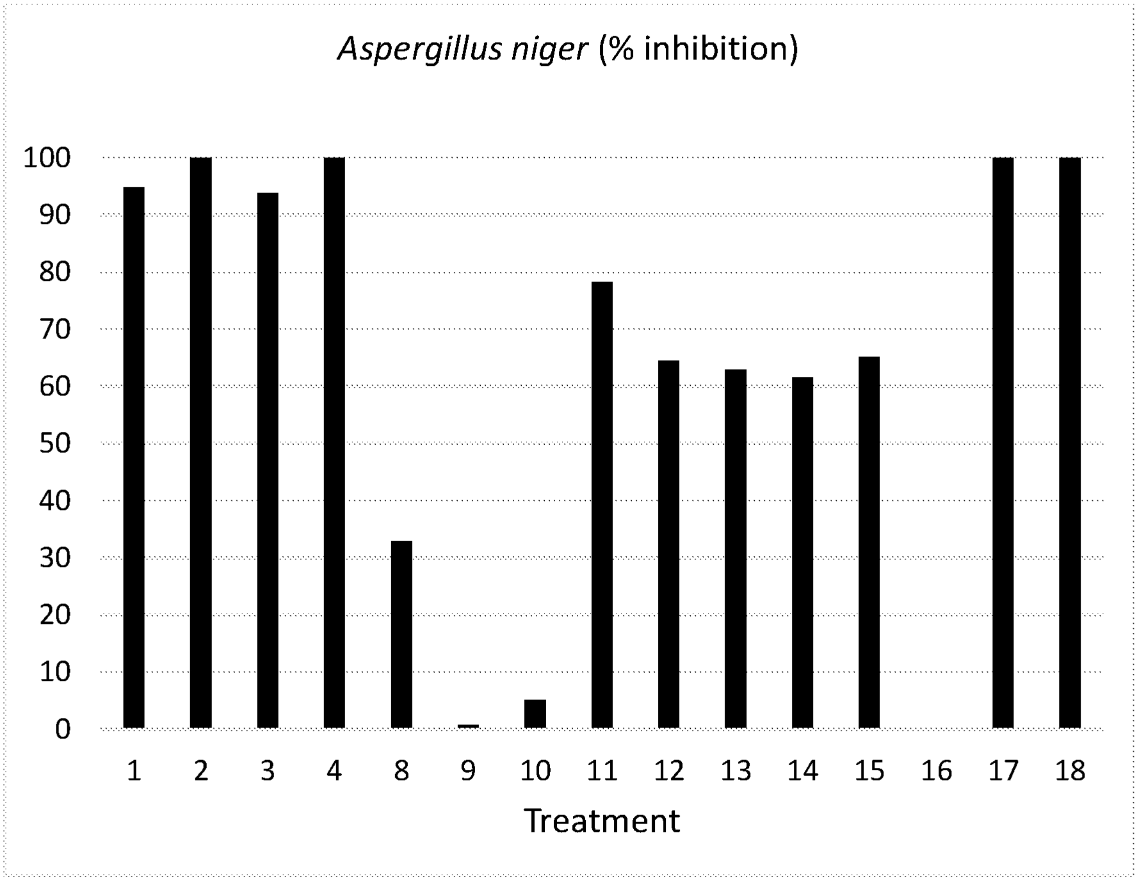
FIG. 1 graphically shows a percentage inhibition of *Aspergillus niger* after exposure to (or treatment with) compositions of this disclosure and other compounds.

The content of the Summary is repeated herein by way of reference thereto to avoid repetition. Generally, there is provided a stable emulsifiable and/or microemulsified liquid fungicidal and insecticidal (in concentrate form and in diluted form) with a high flash point above about 100° C. having epicuticular wax compatibility that promotes bio-efficacy and provides improvement of penetration of an active ingredient (nutrient, pesticide, or the like) through the epicuticular of a target crop or pest. A higher flash point is advantageous as this limits the amount of chemistry (active ingredient, adjuvant, surfactant and the like) that may evaporate from a plant surface. Often an improvement in one physico-chemical property (such as increasing the flash point) may negatively impact another (such as stability, solubility, volatility, dispersibility, viscosity, particle size, efficacy, and the like). The Applicant surprisingly found that the disclosure described herein provides a stable emulsifiable and/or microemulsified liquid anti-pathogenic agricultural composition which outperforms industry standards.

Generally, a first aspect of the disclosure provides for a liquid anti-pathogenic (preferably fungicidal and insecticidal) agricultural composition (in concentrate form), comprising: at least one alkyl ($C_1$-$C_8$) ester of an alkyl ($C_{12}$-$C_{16}$) acid; at least one anionic surfactant; and at least one non-ionic surfactant. The composition has a flash point higher than about 100° C.; and the at least one alkyl ($C_1$-$C_8$) esters of alkyl ($C_{12}$-$C_{16}$) acid has a paraffinic wax (CAS number 8002-74-2) dissolution capability of between 2 wt. % to 20 wt. % at 25° C. The concentrate composition may be diluted with water or other solvents to provide a diluted liquid anti-pathogenic agricultural composition which is typically applied to plants or parts thereof in agriculture.

The disclosure extends to a method of manufacturing the liquid anti-pathogenic agricultural composition according to the first aspect and methods of use, typically within an agricultural field of endeavor.

Definitions

The term "adjuvant" as used herein is a broad term, and is to be given its ordinary and customary meaning to a person of ordinary skill in the art (and is not to be limited to a special or customized meaning), and refers without limitation to an agent that modifies the effect of other agents and more particularly used to enhance the effectiveness of pesticides such as herbicides, insecticides, fungicides and other agents.

The term "stable" as used herein is a broad term, combined or related with the term "emulsion", and is to be given its ordinary and customary meaning to a person of ordinary skill in the art (and is not to be limited to a special or customized meaning), and refers without limitation to the emulsion stability, i.e. the ability of an emulsion to resist change in its properties over time so that the size of the droplets in emulsion does not change significantly with time, more specifically during the time of an application to the targets mixed with water, it is thus to be given its ordinary meaning that is customary to a person skilled in the an. The term "stable" as used herein is a broad term, combined or related with the term "accelerated storage stability", means that the formulation keep similar performance in terms of physico-chemical properties after samples be stored during 15 days in at least 3 conditions: room temperature (around 20° C.); cold temperature (0° C. or 5° C.); hot temperature (54° C.). Storage stability tests were conducted according Method CIPAC MT 36.

The term "solvents" as used herein is a broad term, and is to be given its ordinary and customary meaning to a person of ordinary skill in the art (and is not to be limited to a special or customized meaning), and refers without limitation to compounds with some characteristics of solvency for other compounds or means, that can be polar or non-polar, linear or branched, cyclic or aliphatic, aromatic, naphthenic and that includes but is no limited to: alcohols, esters, diesters, ketones, acetates, terpenes, sulfoxides, glycols, paraffins, hydrocarbons, anhydrides, heterocyclics, among others.

Whenever a group is described as being "optionally substituted" that group may be unsubstituted or substituted with one or more of the indicated substituents. Likewise, when a group is described as being "unsubstituted or substituted" if substituted, the substituent(s) may be selected from one or more the indicated substituents. If no substituents are indicated, it is meant that the indicated "optionally substituted" or "substituted" group may be substituted with one or more group(s) individually and independently selected from alkyl, alkenyl, alkynyl, cycloalkyl, cycloalkenyl, cycloalkynyl, aryl, heteroaryl, heteroalicyclyl, aralkyl, heteroaralkyl, (heteroalicyclyl)alkyl, hydroxy, protected hydroxyl, alkoxy, aryloxy, acyl, mercapto, alkylthio, arylthio, cyano, halogen, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfinyl, sulfonyl, haloalkyl, haloalkoxy, trihalomethanesulfonyl, trihalomethanesulfonamido, an amino, a mono-substituted amino and a di-substituted amino group, and protected derivatives thereof.

The term "alkyl" as used herein is a broad term, and is to be given its ordinary and customary meaning to a person of ordinary skill in the art (and is not to be limited to a special or customized meaning), and refers without limitation to a straight chain or branched, acyclic or cyclic, unsaturated or saturated aliphatic hydrocarbon containing 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 or more carbon atoms, while the term "lower alkyl" has the same meaning as alkyl but contains 1, 2, 3, 4, 5, or 6 carbon atoms. Representative saturated straight chain alkyls include methyl, ethyl, n-propyl, n-butyl, n-pentyl, n-hexyl, and the like; while saturated branched alkyls include isopropyl, sec-butyl, isobutyl, tert-butyl, isopentyl, and the like. Unsaturated alkyls contain at least one double or triple bond between adjacent carbon atoms (referred to as an "alkenyl" or "alkynyl," respectively). Representative straight chain and branched alkenyls include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include acetylenyl, propynyl, 1-butynyl, 2-butynyl, 1-pentynyl, 2-pentynyl, 3-methyl-1 butynyl, and the like. Typical alkyl groups include, but are in no way limited to, methyl, ethyl, propyl, isopropyl, butyl, isobutyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, henatriacontyl, dotriacontyl, tritriacontyl, tetratriacontyl, pentatriacontanyl, and hexatriacontanoic. The alkyl group may be substituted or unsubstituted.

The term "alkoxy" as used herein is a broad term, and is to be given its ordinary and customary meaning to a person of ordinary skill in the art (and is not to be limited to a special or customized meaning), and refers without limitation to an alkyl moiety attached through an oxygen bridge (i.e., —O-alkyl) such as methoxy, ethoxy, and the like.

The term "thioalkyl" as used herein is a broad term, and is to be given its ordinary and customary meaning to a person of ordinary skill in the art (and is not to be limited to a special or customized meaning), and refers without limitation to an alkyl moiety attached through a sulfur bridge (i.e., —S-alkyl) such as methylthio, ethylthio, and the like.

The term "alcohol" as used herein is a broad term, and is to be given its ordinary and customary meaning to a person of ordinary skill in the art (and is not to be limited to a special or customized meaning), and refers without limitation to any compound as described herein incorporating one or more hydroxy groups, or being substituted by or functionalized to include one or more hydroxy groups.

The term "ester" as used herein is a broad term, and is to be given its ordinary and customary meaning to a person of ordinary skill in the art (and is not to be limited to a special or customized meaning), and refers without limitation to any compound as described herein incorporating one or more ester groups, e.g., monoester, diester, triester, or polyester, or being substituted by or functionalized to include one or more ester groups. Esters include but are not limited to fatty acid esters.

The term "acetates" as used herein is a broad term, and is to be given its ordinary and customary meaning to a person of ordinary skill in the art (and is not to be limited to a special or customized meaning), and refers without limitation to any compound as described herein incorporating one or more acetate groups, such as salts, esters or other compounds incorporating a $CH_3COO$— moiety.

The term "terpenes" as used herein is a broad term, and is to be given its ordinary and customary meaning to a person of ordinary skill in the art (and is not to be limited to a special or customized meaning), and refers without limitation to any compound as derived from resins of plants such as conifers, or to synthetically produced compounds having the same structures as plant derived terpenes. Terpenes can include hydrocarbons as well as terpenoids containing additional functional groups, as well as essential oils. Terpenes can include compounds having a formula $(C_5H_8)_n$ where n is the number of linked isoprene units (e.g., 1, 2, 3, 4, 5, 6, 7, 8, 9, 10, or more).

The term "terpene containing natural oil" as used herein is a broad term, and is to be given its ordinary and customary meaning to a person of ordinary skill in the art (and is not to be limited to a special or customized meaning), and refers without limitation to a natural oil containing at least 50% of a terpene selected from but not exclusively from the group consisting of orange oil, grapefruit oil, lemon oil, lime oil, tangerine oil, and pine oil or components thereof.

The term "sulfoxides" as used herein is a broad term, and is to be given its ordinary and customary meaning to a person of ordinary skill in the art (and is not to be limited to a special or customized meaning), and refers without limitation to any compound as described herein incorporating one or more sulfinyl (SO) groups, or being substituted by or functionalized to include one or more sulfinyl groups.

The term "glycols" as used herein is a broad term, and is to be given its ordinary and customary meaning to a person of ordinary skill in the art (and is not to be limited to a special or customized meaning), and can include diols, e.g., polyalkylene glycols such as polyethylene glycols (polymers having the formula $H(OCH_2CH_2)_nOH$ where n is greater than three), polypropylene glycols, or glycols incorporating monomers comprising longer hydrocarbon chains.

The term "paraffins" as used herein is a broad term, and is to be given its ordinary and customary meaning to a person of ordinary skill in the art (and is not to be limited to a special or customized meaning), and refers without limitation to heavier alkanes, such as alkanes forming a liquid or wax at room temperature, as well as functionalized paraffins, e.g., chlorinated paraffins, and mineral or synthetic oils comprising hydrocarbons. Room temperature as used herein refers to ambient conditions, e.g., in a climate controlled building, for example, approximately 20° C.

The term "hydrocarbons" as used herein is a broad term, and is to be given its ordinary and customary meaning to a person of ordinary skill in the art (and is not to be limited to a special or customized meaning), and refers without limitation to any compound comprising only carbon and hydrogen atoms. A functionalized or substituted hydrocarbon has one or more substituents as described elsewhere herein.

The term "anhydrides" as used herein is a broad term, and is to be given its ordinary and customary meaning to a person of ordinary skill in the art (and is not to be limited to a special or customized meaning), and refers without limitation to any compound as described herein incorporating one or more anhydride groups (of formula $(RC(O))_2O$), or being substituted by or functionalized to include one or more anhydride groups.

The term "sulfonic acid" as used herein is a broad term, and is to be given its ordinary and customary meaning to a person of ordinary skill in the art (and is not to be limited to a special or customized meaning), and refers without limitation to, for example formic, acetic, succinic, lactic, malic, tartaric, citric, ascorbic, nicotinic, methanesulfonic, ethanesulfonic, p-toluensulfonic, salicylic or naphthalene sulfonic acid. Sulfonic acids can include hydrocarbyl sulfonic acids, such as aryl sulfonic acids, alkyl benzene sulfonic acid, among other.

The term "vegetable oil" as used herein is a broad term, and is to be given its ordinary and customary meaning to a person of ordinary skill in the art (and is not to be limited to a special or customized meaning), and refers without limitation to oleaginous fatty acid constituents of vegetable matter, e.g., saturated fatty acids, monounsaturated fatty acids, polyunsaturated fatty acids, etc. The vegetable oil can be functionalized, e.g., alkoxylated, hydroxylated, aminated, etc. A functionalized vegetable oil is a derivative of a vegetable oil or other fatty substance, or a substance having a similar composition regardless of the origin of the substance. In some embodiments, the functionalized vegetable oil is epoxidized unsaturated triglyceride. Epoxidized unsaturated triglyceride is a tri-ester of glycerine. The glycerine bonds to three linear or branched carboxylic acids, wherein at least one of the carboxylic acids comprises an epoxide moiety. For example, the epoxidized unsaturated triglyceride may be a derivative of an unsaturated fatty acid triglyceride such as a vegetable or animal fat or oil, wherein at least one of the C═C moieties of the parent unsaturated fatty acid triglyceride is replaced with an epoxide moiety (i.e. a three-membered ring containing an oxygen). If the parent unsaturated fatty acid triglyceride has more than one C═C moiety, one, part, or all of the C═C moieties may be replaced by epoxide moieties. When the term "vegetable oil" is used herein, it is understood to include animal fats, or oils of synthetic origin, having a same chemical structure as a vegetable oil. Examples of vegetable or animal fats or oils include coconut oil, corn oil, cottonseed oil, olive oil, palm oil, peanut oil, rapeseed oil, canola oil, safflower oil, sesame oil, soybean oil, sunflower oil, castor oil, tallow oil, or the like.

As used herein, the abbreviations for any compound, is, unless indicated otherwise, in accord with its common usage, recognized abbreviations, or the IUPAC-IUB Commission on Biochemical Nomenclature (See, Biochem. 11:942-944 (1972)).

Any percentages, ratios or other quantities referred to herein are on a weight basis, unless otherwise indicated.

The cyclic systems referred to herein include fused ring, bridged ring, and spiro ring moieties, in addition to isolated monocyclic moieties.

EXAMPLES

The examples here below are not to be considered as limiting to the disclosure. The broad disclosures made in the Summary and Detailed Description herein above are repeated by way of reference. The Applicant envisages conducting further experimental protocols regarding the liquid anti-pathogenic agricultural composition described herein and its use.

Wax Solubility Test

Method of Preparation of the Paraffin Wax Solubility Test

A method to evaluate the capability of a solvent to dissolve paraffin wax was developed and it helps to understand how will be performed certain solvent when applied to an epicuticular surface of a plant or an insect.

The method for preparing a Paraffin Wax solubility test that define a speed which a solvent dissolve a paraffin wax (CAS number 8002-74-2) during the time, in a period of at least 24 hours. Steps to conduct the test are: a) weigh 98 grams of solvent into 8 oz glass jar along; b) place jar with solvent onto laboratory balance and tare weight; c) add 2 grams of molten (at 110° F. or 43.3° C.) paraffins wax into solvent, put a 1 inch magnetic stir bar inside and cap; d) place the jar containing the solvent with paraffins wax sample onto magnetic stir plate and begin stirring at 350 rpm—start a clock counter each sample; e) observe and record time when the entire amount of paraffins wax has dissolved, or not.

TABLE 1

Results of performance of solvents to dissolve paraffin wax

| Chemical name | Sample weight (g) | Temperature (° c.) | Paraffin wax (g) | Dissolution Time (minutes) | Observation |
|---|---|---|---|---|---|
| cold pressed orange oil | 98 | 25 | 2.0 | 3 | stable at 25° c. |
| LPA 210 solvent | 98 | 25 | 2.0 | 30 | stable at 25° c. |
| isopropyl laurate | 98 | 25 | 2.0 | 102 | stable at 25° c. |
| Aromatic 200 | 98 | 25 | 2.0 | 197 | stable at 25° c. |
| methyl caprylate/caprate | 98 | 25 | 2.0 | 205 | stable at 25° c. |
| methyl laurate | 98 | 25 | 2.0 | 300 | stable at 25° c. |
| isobutyl laurate | 98 | 25 | 2.0 | 340 | stable at 25° c. |
| isoamyl laurate | 98 | 25 | 2.0 | 620 | stable at 25° c. |
| isopropyl myristate | 98 | 25 | 2.0 | 627 | stable at 25° c. |
| 2-ethylhexyl laurate | 98 | 25 | 2.0 | 930 | stable at 25° c. |
| N,N-dimethyldecanamide | 98 | 25 | 2.0 | — | undissolved after 24-hours stirring |
| butyl cellusolve | 98 | 25 | 2.0 | — | undissolved after 24-hours stirring |
| tetrahydrofurfural alcohol | 98 | 25 | 2.0 | — | undissolved after 24-hours stirring |
| dimethyl sulfoxide | 98 | 25 | 2.0 | — | undissolved after 24-hours stirring |
| propylene carbonate | 98 | 25 | 2.0 | — | undissolved after 24-hours stirring |
| methyl palmitate/oleate | 98 | 25 | 2.0 | — | undissolved after 24-hours stirring |
| methyl soyate | 98 | 25 | 2.0 | — | undissolved after 24-hours stirring |
| cyclohexanone | 98 | 25 | 2.0 | — | undissolved after 24-hours stirring |

Examples of Products According the Present Disclosure

Method of Preparation of the Fungicidal and Insecticidal Concentrate

For the purpose of illustration, the method for preparing the liquid anti-pathogenic agricultural composition (preferably a liquid fungicidal and insecticidal agricultural composition) (in its concentrate form) as used in the non-limiting examples, includes the following steps: (i) admixing into a vessel with a portion of water and/or oil, (ii) adding at least one anionic surfactant such as a sodium lauryl ether sulfate, (iii) adding at least one nonionic surfactant such a fatty alcohol ethoxylated, and (iv) adding at least one solvent form the group of alkyl ($C_1$-$C_8$) esters of alkyl ($C_{12}$-$C_{16}$) acids such as isopropyl myristate and/or isopropyl laurate. The method may optionally include an additional further step (v) adding at least one additive such as, but not limited to, a preservative and/or a colorant. Typically, the steps above are conducted in sequence from step (i) to step (iv) and further the optional step (v). The admixture is continuously stirred. Heating is not necessarily required but may advantageously be employed depending on the physical state of each compound. For certain components, lower temperatures or higher temperatures may be employed. The temperature can be selected so as to facilitate mixing within a desired time period, while avoiding degradation or undesired reaction of the components. Other additives can also be added for specific purposes, such as, but not limited to, clarifiers, anti-foaming agents, anti-freezing agents, hydrotropes, UV stabilizers, colorants, nutrients, amino-acids, sea extract, anti-drift agents, anti-freezing agents, and water, oil, terpenes, terpene containing oils, or other solvents and combinations thereof.

The diluted liquid anti-pathogenic (fungicidal and insecticidal) agricultural composition may comprise various ratios of components, typically the fungicidal and insecticidal composition, in its concentrated liquid form, comprises from about 1 to about 30% of the at least one alkyl ($C_1$-$C_8$) esters of alkyl ($C_{12}$-$C_{16}$) acids; from about 1 to about 30% by weight the at least one anionic surfactant; from about 1 to about 40% by weight of one or more nonionic surfactants; and from about 2 to about 80% of water, oils or other additives.

Specifically, the liquid concentrate anti-pathogenic (fungicidal and insecticidal) agricultural composition (i.e. the liquid anti-pathogenic agricultural composition in its concentrated liquid form), comprises from 1 to 30 wt. % of the at least one alkyl ($C_1$-$C_8$) esters of alkyl ($C_{12}$-$C_{16}$) acids—preferably between to 3 to 12 wt. % by weight; the at least one anionic surfactant comprises from 1 to 30 wt. % by weight—preferably from 3 to 20% by weight; the at least one nonionic surfactant from 1 to 40 wt. % by weight—preferably from 5 to 30 wt. % by weight; and wherein the water, oils or other additives are from 20 to 70 wt. % by weight—preferably from 30 to 65 wt. % by weight. In other words, where the liquid concentrate anti-pathogenic (fungicidal and insecticidal) agricultural composition has a weight of 100 g it comprises 1 to 30 g of the at least one alkyl ($C_1$-$C_8$) esters of alkyl ($C_{12}$-$C_{16}$) acids—preferably between to 3 to 12 g; the at least one anionic surfactant comprises from 1 to 30 g—preferably from 3 to 20 g; the at least one nonionic surfactant from 1 to 40 g—preferably from 5 to 30 g; and wherein the water, oils or other additives are from 20 to 70 g—preferably from 30 to 65 g. Any percentages, ratios or other quantities referred to herein are on a weight basis in grams, unless otherwise indicated.

Preparing the Liquid Concentrate Anti-Pathogenic (Fungicidal and Insecticidal) Agricultural Compositions According to this Disclosure Four different liquid concentrate anti-pathogenic (fungicidal and insecticidal) agricultural compositions (in concentrate form), were prepared according to some of the embodiments of this disclosure. The concentrates fungicidal and insecticidal with high flash point and an epicuticular wax compatibility are indicated by ORO-009-K, ORO-009-T, ORO-079-FB and ORO-296-A. The details of the specific embodiments are shown in Table 2. Various components were employed in the different formulations, including soybean methyl ester—oil; cold pressed orange oil—oil; polyoxyethylene sorbitan monolaurate—anionic surfactant; alcohol ethoxylated POE-6—nonionic surfactant; triethanolamine dodecylbenzene sulfonate—anionic surfactant; calcium dodecyl benzene sulfonate—anionic surfactant; sodium dodecyl benzene sulfonate—anionic surfactant; sodium lauryl ether sulfate—anionic surfactant; alcohol ethoxylated and propoxylated EOPO 6/9—nonionic surfactant; Isopropyl Myristate—oil, Methyl Laurate—oil, Isopropyl Laurate—oil.

TABLE 2

Fungicidal and insecticidal concentrates made according the present invention

| Compound | ORO-009-K | ORO-009-T | ORO-079-FB | ORO-296-A |
|---|---|---|---|---|
| | Amount (weight/weight %) | | | |
| Isopropyl Myristate | 7.00 | — | 8.00 | 5.00 |
| Isopropyl Laurate | — | — | 2.00 | — |
| Methyl Laurate | — | 4.00 | — | — |
| Alcohol Ethoxylated 6 POE | 9.00 | 15.00 | 25.00 | 12.00 |
| Sodium Alkyl Benzene Sulfonate | 10.00 | — | — | 11.00 |
| Calcium Alkyl Benzene Sulfonate | — | 5.00 | — | — |
| Sodium lauryl ether sulfate | 8.00 | — | 12.00 | 7.00 |
| Polyoxyethylene sorbitan monolaurate | — | 7.00 | — | — |
| Other additives | 5.00 | 5.00 | 5.00 | 5.00 |
| Water | 65.00 | 64.00 | 48.00 | 60.00 |
| TOTAL (weight/weight %) | 100.0 | 100.0 | 100.0 | 100.0 |
| FORMULATION TYPE | Microemulsified | Microemulsified | Microemulsidifi | Microemulsidified |

Physico-Chemical and Accelerated Stability Tests

Samples of products of certain embodiments were compared to commercially available products and analyzed to determine their physical chemical characteristics and their behavior when diluted in water—pH and stability of emulsion; and into the pure fungicidal and insecticidal, flash point using a closed cup using methodology described on CIPAC Handbook F— Collaborative International Pesticide Analytical Ltd, 1994, reprint in 2007, the contents of which are hereby incorporated by reference in their entirety. These commercially available products included from Oro Agri® the following products PREV-AM® (an insecticide and/or fungicide and/or miticide based on sodium tetraborohydrate decahydrate and orange oil); and from other companies—ABACUS™ (an insecticide and/or miticide based on Abamectin available from Rotam North America Inc.; SAFARI™ 20SG Insecticide an insecticide based on Dinotefuran available from Valent U.S.A. Corporated; and CAPSIL™ (a nonionic adjuvant based on dimethylsiloxane available from Aquatrols Corporation of America. It was determined that the products prepared according to the embodiments of this disclosure exhibited stability in accelerated storage stability testing, and all samples were stable even in cold (14 days @ 0° C.) or hot conditions (14 days @ 54° C.). The stability results are shown in Table 3 and Table 4.

TABLE 3

Physico-chemical properties and accelerated stability test results - compositions made in accordance with this disclosure

| ANALYSIS | ORO-009-K | ORO-009-T | ORO-296-A | ORO-079-FB |
|---|---|---|---|---|
| Appearance (product) | Clear Golden | Clear Golden | Clear Golden | Clear Golden |
| Density @ 20° C. | 1.009 | 1.008 | 1.007 | 1.003 |
| pH (product) | 7.30 | 7.43 | 7.00 | 6.57 |
| pH (1% v/v) | — | — | — | — |
| Viscosity @ 25° C. | 25 Cp | 34 Cp | 25 Cp | 22 Cp |
| Flash Point Closed Cup - CIPAC MT12 | >121.1° C. (>250° F.)* | >121.1° C. (>250° F.)* | >121.1° C. (>250° F.)* | >121.1° C. (>250° F.)* |
| Appearance (solution at 0.25% - distillated | Clear | Clear | Clear | Clear |
| Emulsion Stability (CIPAC MT 36) 1% v/v 2 hours @ 30° C. Water CIPAC A and D | No cream and No Oil | No cream and No Oil | No cream and No Oil | No cream and No Oil |
| Emulsion Stability Method CIPAC MT 36 1% v/v 24 h 30 hours re-emulsified at 30° C Water CIPAC A and D | No cream and No Oil | No cream and No Oil | No cream and No Oil | No cream and No Oil |
| Accelerated Storage Procedure Method CIPAC MT 46 (14 days at 0°, 20° and 54° C.) | Stable | Stable | Stable | Stable |

*No flash point was achieved until the temperature described.

TABLE 4

Physio-chemical properties for commercially available products used as Standards treatment

| ANALYSIS | PREV-AM ® | ABACUS ™ | SAFARI ™ 20SG Insecticide |
|---|---|---|---|
| Appearance (product) | Green liquid | Yellowish liquid | Off-white granules |
| Density @ 20° C. | 1.020 | 0.966 | — |
| pH (product) | 5.80 | — | — |
| pH (1.0% v/v) | 5.90 | 3.66 | 7.50 |
| Viscosity @ 25° C. | 25 cP | 8 cP | — |
| Flash Point - closed cup (@ 760 mmHg) | 68.8° C. (>212° F.) | 76.5° C. (169.7° F.) | — |
| Appearance (solution at 0.25% - distillated water) | Clear | Cloudy | Turbid suspension |
| Emulsion Stability Method CIPAC MT 36 1% v/v - 2 hours @ 30° C. Water CIPAC A and D | No cream and No Oil | No cream and No Oil | — |
| Emulsion Stability Method CIPAC MT 36 1% v/v - 24 h 30 hours re-emulsified @ 30° C. Water CIPAC A and D | No cream and No Oil | No cream and No Oil | — |
| Accelerated Storage Method CIPAC MT 46 (14 days at 0, 20 and 54° C.) | Stable | Stable | Stable |

PREV-AM ® - by Oro Agri Inc.
ABACUS ™ - by Rotam North America Inc
SAFARI ™ 20SG Insecticide - supplied by Valent USA Corporation Disease Bio-Efficacy Screening Samples of products of certain embodiments were evaluated in a disease bio-efficacy screening at University of California Davis/Kearney Agricultural Research and Extension Center in comparison with other products and samples to evaluate pH effect, adjuvancy effect and efficacy against most common or applicable plant pathogens in vitro. Sample identification is shown in Tables 5 and 6.

TABLE 5

Samples identification for various treatments for comparison purposes

| Treatment | 1 | 2 | 3 | 4 | 8 | 9 | 10 |
|---|---|---|---|---|---|---|---|
| Fungicide | Fung. I * | Fung. I * | Fung. I * | Fung. I * | Fung. II ** | Fung. II ** | Fung. II ** |
| Dosage (% v/v) | 0.5 | 1 | 0.5 | 1 | 0.5 | 1 | 2 |
| Chemical Activator (Adjuvant) | Adjv. I *** | Adjv. I ** | Adjv. II **** | Adjv. II **** | Citric Acid 50% | Citric Acid 50% | Citric Acid 50% |
| Dosage Adj. (% v/v) | 0.25 | 0.5 | 0.25 | 0.5 | Adjust pH to 5 | Adjust pH to 5 | Adjust pH to 5 |

* FUNG. I (Innovative fungicide based on Potassium Sorbate OR-159-B of PCT/IB2020/050112)
** FUNG. II (Innovative fungicide based on Potassium Sorbate - OR-159-G of PCT/IB2020/050112)
*** ADJV. I (Innovative acidifier adjuvant based on Alkyl Ester - OR-278-C of PCT/IB2020/050112)
**** ADJV. II (Innovative acidifier adjuvant based on Alkyl Ester - OR-097-V of PCT/IB2020/050112)

TABLE 6

Samples identification for various treatments for comparison purposes, wherein Treatment 17 and 18 are embodiments according to this disclosure

| Treatment | 11 | 12 | 13 | 14 | 15 | 17 | 18 | 19 |
|---|---|---|---|---|---|---|---|---|
| Code | EXP. I + | EXP. II ++ | PREV-AM ® | PREV-AM ® | EXP. III +++ | OR-296-A | OR-296-A | Untreated (UTC) |
| Dosage (% v/v) | 0.25 | 0.25 | 0.25 | 0.4 | 0.25 | 1 | 0.5 | — |
| Adjuvant | — | — | — | — | — | — | — | — |
| Dosage Adj. (% v/v) | — | — | — | — | — | — | — | — |

+ EXP. I (Fungicide based on Natural Oil marketed as Transformer ®)
++ EXP. II (Fungicide based on Natural Oil marketed as Oroboost ®)
+++ EXP. III (Fungicide based on Natural Oil marketed as Wetcit ®). All commercially available products have known anti-pathogenic properties.

Growth inhibition was measured using potato dextrose agar (PDA) amended with the test compounds to compare colony growth of several fungi. Plain (unamended) PDA plates served as controls. Cultures of *Aspergillus niger, Botrytis cinerea, Colletotrichum fioriniae, Fusarium moniliforme, F. oxysporum, Macrophomina phaseolina, Verticillium dahlia*, and *Xanthomonas arboricola pv. juglandis* were grown on acidified potato dextrose agar. The amended and control plates were inoculated with mycelial plugs (5 mm diameter), then incubated at 25° C. until the colonies in the controls neared the edge of the plates for each species. At that time, colony radius was measured and percent inhibition was calculated for each test compound in relation to the radius of control plates.

TABLE 7

Summary percent growth inhibition of various agricultural compositions and comparative products against a number of important plant pathogens.

| | % inhibition in relation to untreated control | | | | | | | | | | | | | | | |
|---|---|---|---|---|---|---|---|---|---|---|---|---|---|---|---|---|
| Treatment | *Aspergillus niger* | | *Botrytis cinerea* | | *Colletotrichum fioriniae* | | *Fusarium moniliforme* | | *Fusarium oxysporum* | | *Macrophomina phaseolina* | | *Verticillium dahliae* | | *Xanthomonas arboricola* pv. *juglandis* | |
| 1 | 94.81 | a | 90.88 | b | 84.94 | b | 100 | a | 100 | a | 100 | a | 100 | a | 100 | a |
| 2 | 100 | a | 100 | a | 97.22 | a | 100 | A | 100 | a | 100 | a | 100 | a | 100 | a |
| 3 | 93.78 | a | 95.43 | ab | 84.41 | b | 100 | A | 100 | a | 100 | a | 100 | a | 100 | a |
| 4 | 100 | a | 100 | a | 100 | a | 100 | A | 100 | a | 100 | a | 100 | a | 100 | a |
| 8 | 32.9 | d | 29.51 | h | 31.48 | e | 27.63 | G | 28.09 | ef | 78.05 | c | 54.06 | e | 66.18 | b |
| 9 | 0.73 | e | 34 | gh | 1.61 | g | 24.15 | H | 25.97 | fg | 83.32 | bc | 39.08 | f | 68.54 | b |
| 10 | 5.14 | e | 38.06 | g | 4.19 | g | 37.31 | F | 33.72 | e | 100 | a | 52.87 | e | 100 | a |

TABLE 7-continued

Summary percent growth inhibition of various agricultural compositions and comparative products against a number of important plant pathogens.

| Treatment | % inhibition in relation to untreated control | | | | | | | | | | | | | | | |
|---|---|---|---|---|---|---|---|---|---|---|---|---|---|---|---|---|
| | *Aspergillus niger* | | *Botrytis cinerea* | | *Colletotrichum fioriniae* | | *Fusarium moniliforme* | | *Fusarium oxysporum* | | *Macrophomina phaseolina* | | *Verticillium dahliae* | | *Xanthomonas arboricola* pv. *juglandis* | |
| 11 | 78.28 | b | 58.74 | d | 72.87 | c | 51.51 | E | 58.68 | d | 55.61 | d | 80.34 | cd | 58.25 | b |
| 12 | 64.45 | c | 48.86 | ef | 59.97 | d | 54.76 | D | 58.74 | d | 4.82 | e | 84.27 | be | 59.39 | B |
| 13 | 62.93 | c | 45.54 | f | 73.91 | c | 78.55 | C | 70.92 | c | 88.11 | be | 89.57 | b | 25.61 | C |
| 14 | 61.61 | c | 51.23 | e | 77.66 | c | 84.09 | B | 72.76 | bc | 89.54 | ab | 88.29 | b | 26.51 | C |
| 15 | 65.12 | c | 44.13 | f | 76.44 | c | 82.9 | B | 78.74 | b | 85.98 | be | 74.64 | d | 7.73 | D |
| 17 | 100 | a | 100 | a | 100 | a | 100 | A | 100 | a | 100 | a | 100 | a | 100 | A |
| 18 | 100 | a | 100 | a | 100 | a | 100 | A | 100 | a | 100 | a | 5.69 | g | 100 | A |

Values with same letter are not significantly different. Comparisons are made within pathogens only, not between pathogens.

The results of these in vitro tests showed that some of these compounds are very effective in inhibiting the growth of some of the tested pathogens. For instance, treatments, OR-296-A (Treatments 17 and 18), FUNG.I at 0.5% mixed with ADJV. I at 0.25% and FUNG.I at 1% mixed with ADJV. I at 0.5% (Treatments 1 and 2) and FUNG.I at 0.5% at 0.25% mixed with ADJV. II at 0.25% and FUNG.I at 1% mixed with ADJV. II at 0.5% (Treatments 3 and 4) had a significantly greater inhibition against all 8 plant pathogens tested. *Fusarium moniliforme, F. oxysporum, Macrophomina phaseolina*, and *Xanthomonas arboricola pv. juglandis* were inhibited totally. *Verticillium dahlia* show an outlier result with OR-296-A at 0.5% and may be human error to be retested.

With some exceptions, reference treatments (Treatments 11 to 15) inhibited the majority of the fungi from 44% to 100%. Exp. I, Exp. II and Exp. III are based on volatile natural oil and do not perform satisfactorily. Treatments 13 and 14 are the reference product PREV-AM® based on sodium tetraborohydrate decahydrate and orange oil and had performance inferior to showed by products according this disclosure (Treatments 17 and 18).

Figure 2:
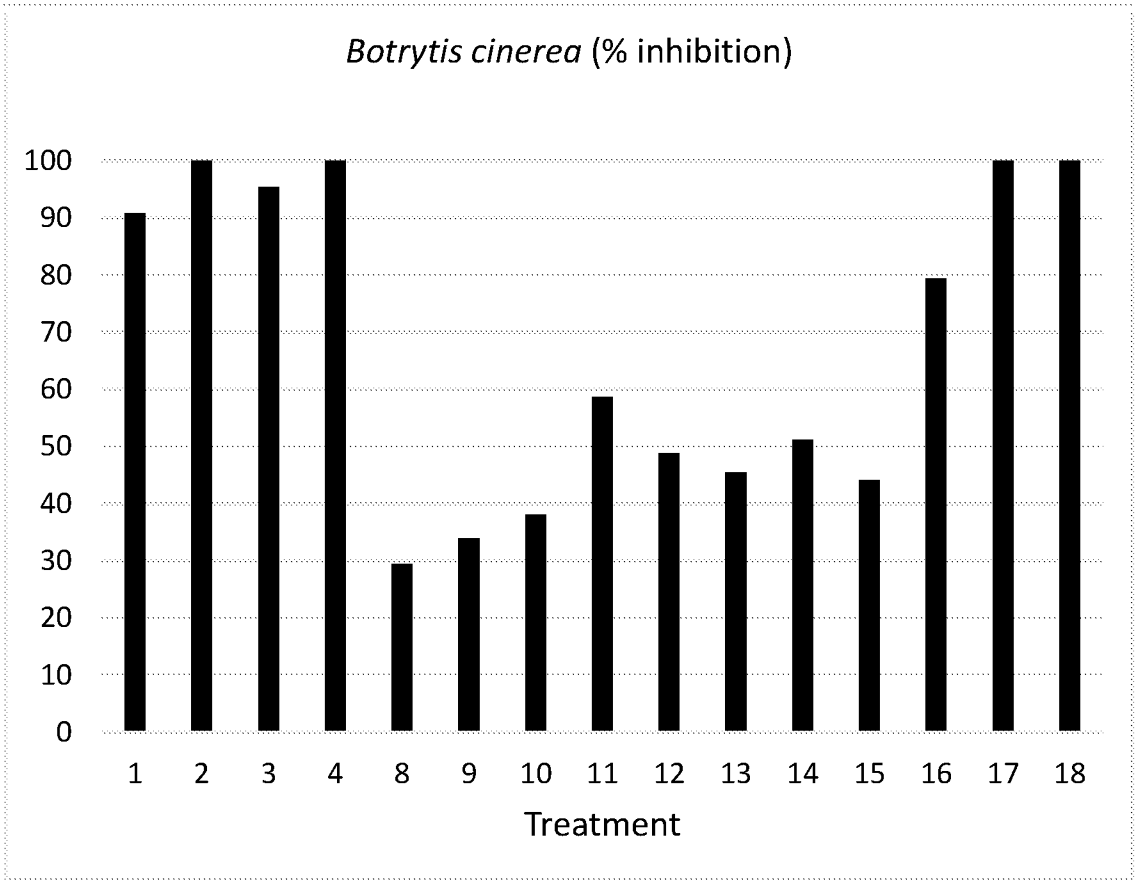
FIG. 2 graphically shows a percentage inhibition of *Botrytis cinerea* after exposure to (or treatment with) compositions of this disclosure and other compounds.
Figure 3:
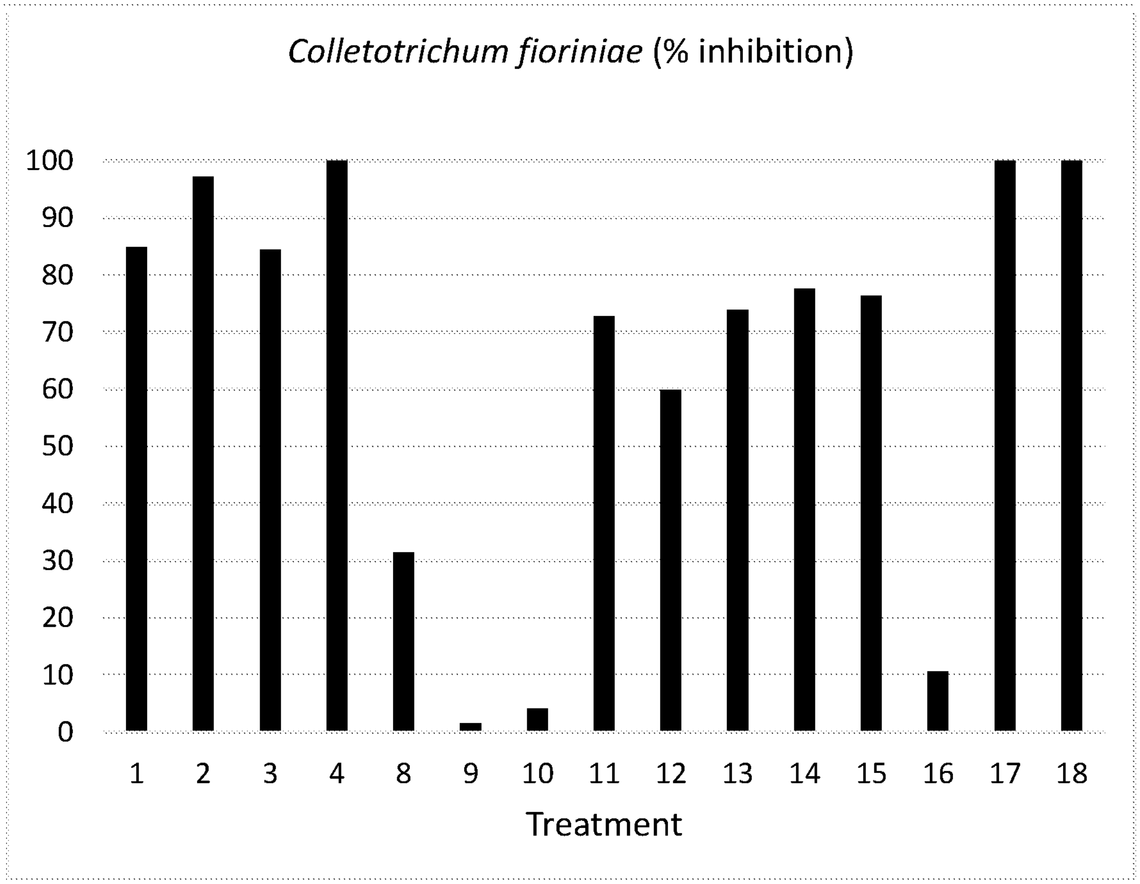
FIG. 3 graphically shows a percentage inhibition of *Colletotrichum fioriniae* after exposure to (or treatment with) compositions of this disclosure and other compounds.
Figure 4:
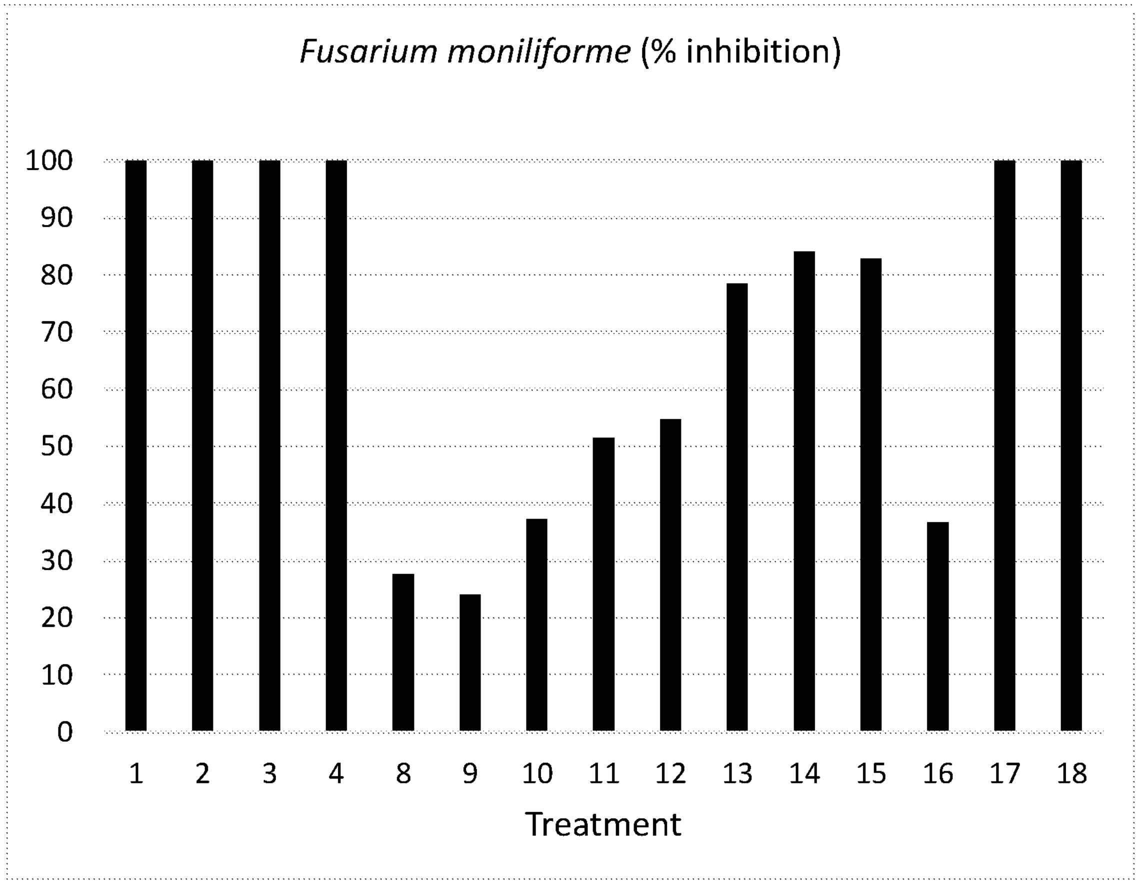
FIG. 4 graphically shows a percentage inhibition of *Fusarium moniliforme* after exposure to (or treatment with) compositions of this disclosure and other compounds.
Figure 5:
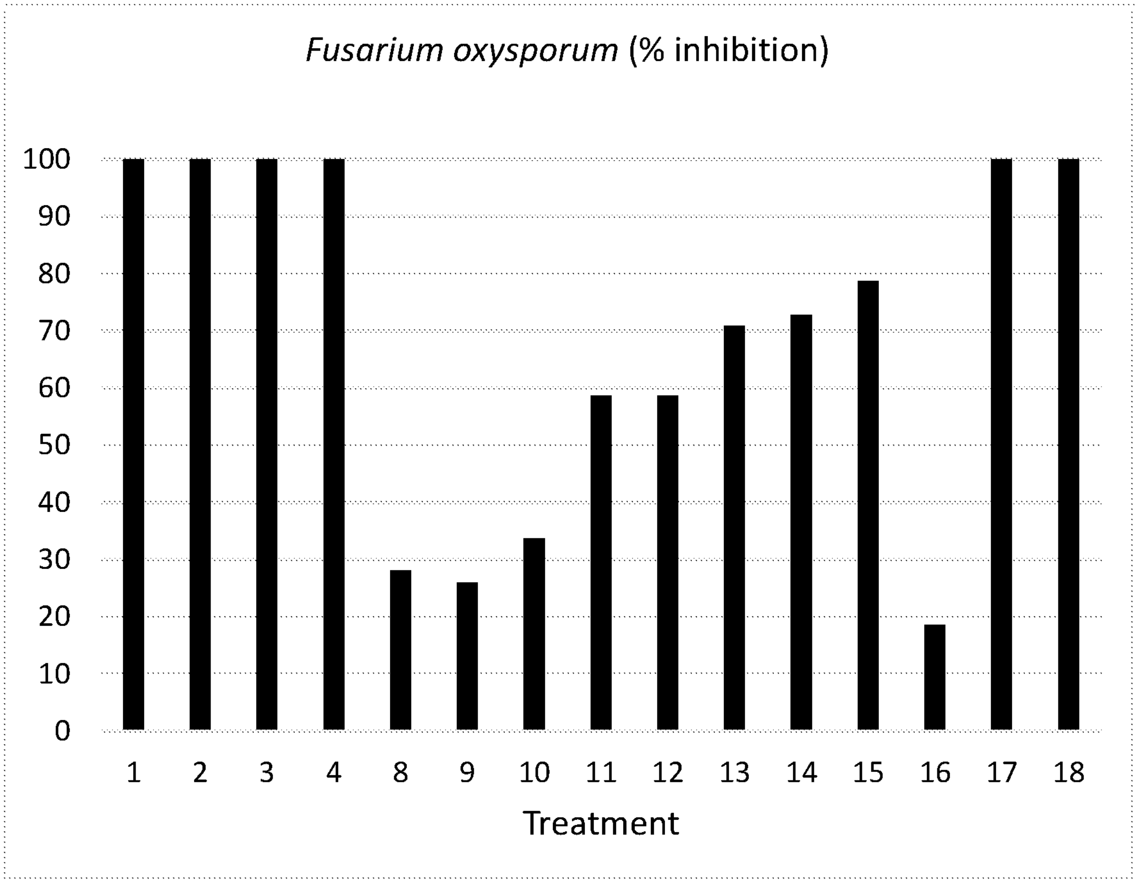
FIG. 5 graphically shows a percentage inhibition of *Fusarium oxysporum* after exposure to (or treatment with) compositions of this disclosure and other compounds.
Figure 6:
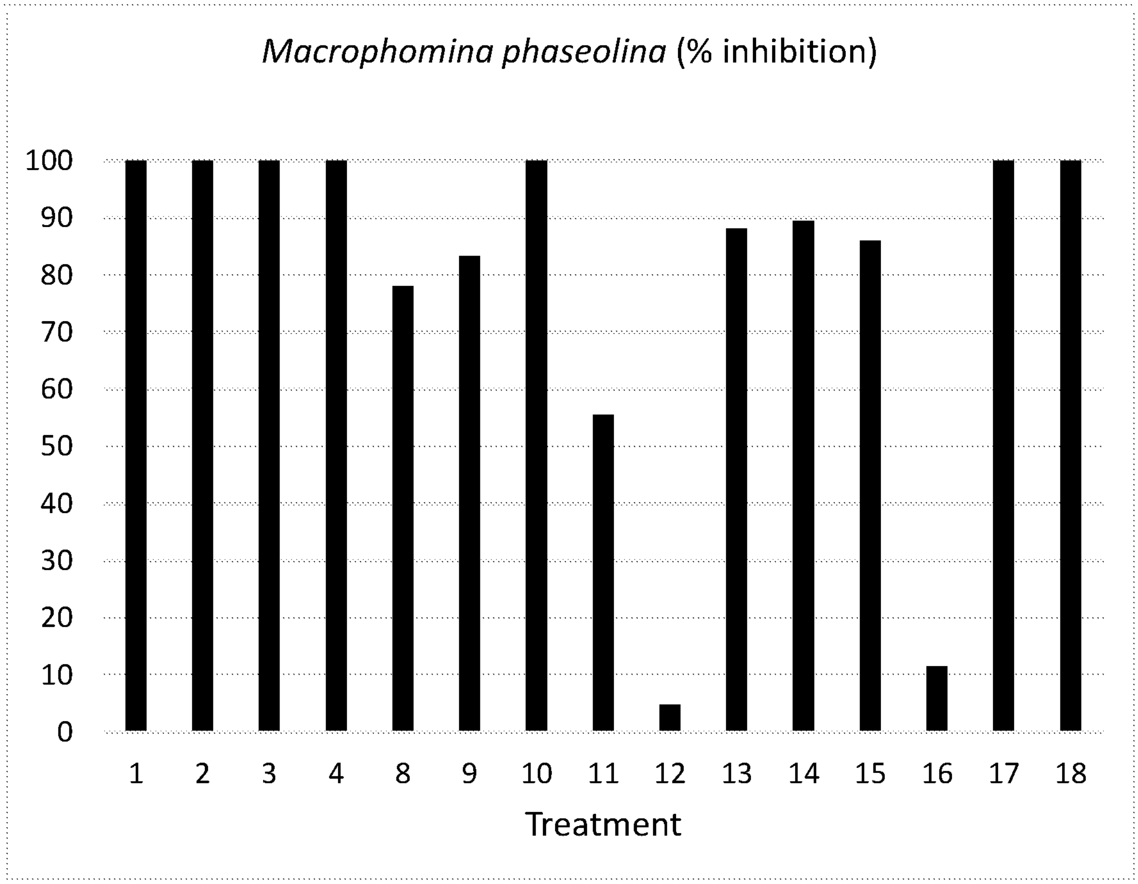
FIG. 6 graphically shows a percentage inhibition of *Macrophomina phaseolina* after exposure to (or treatment with) compositions of this disclosure and other compounds.
Figure 7:
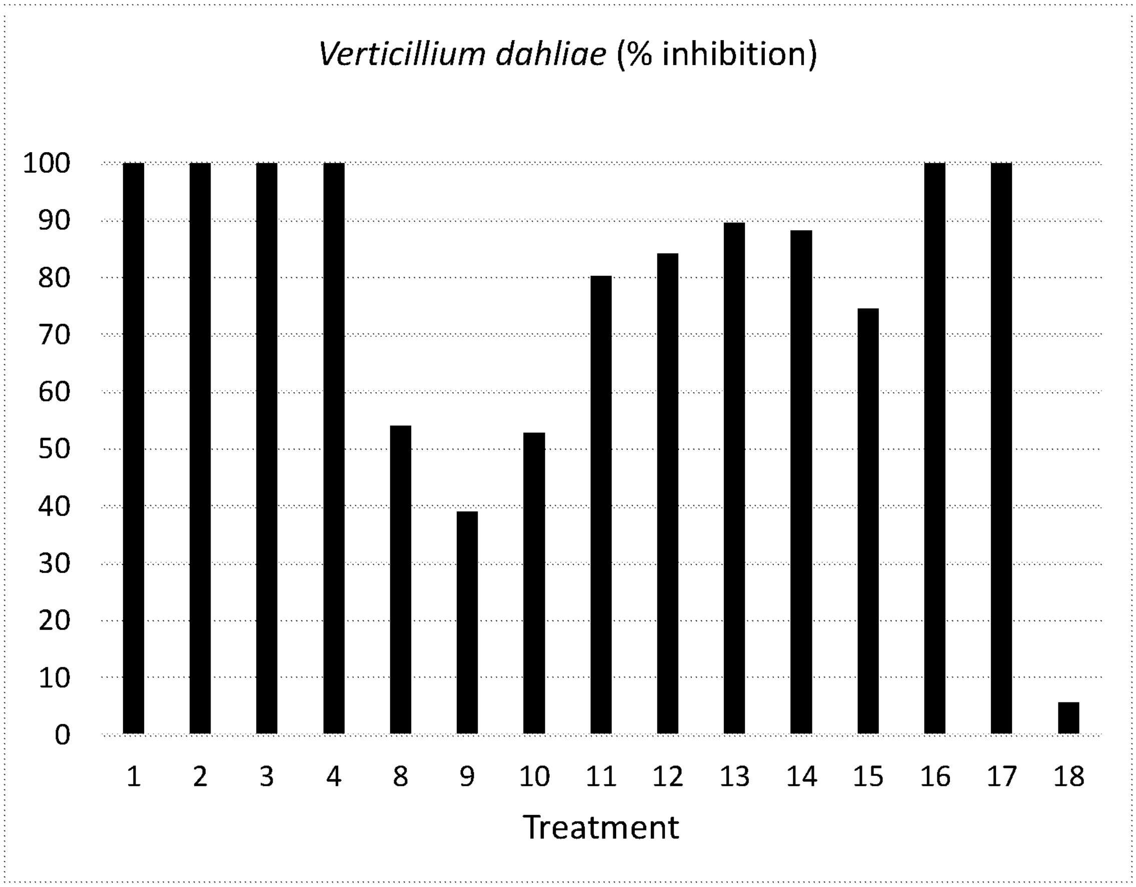
FIG. 7 graphically shows a percentage inhibition of *Verticillium dahlia* after exposure to (or treatment with) compositions of this disclosure and other compounds.
Figure 8:
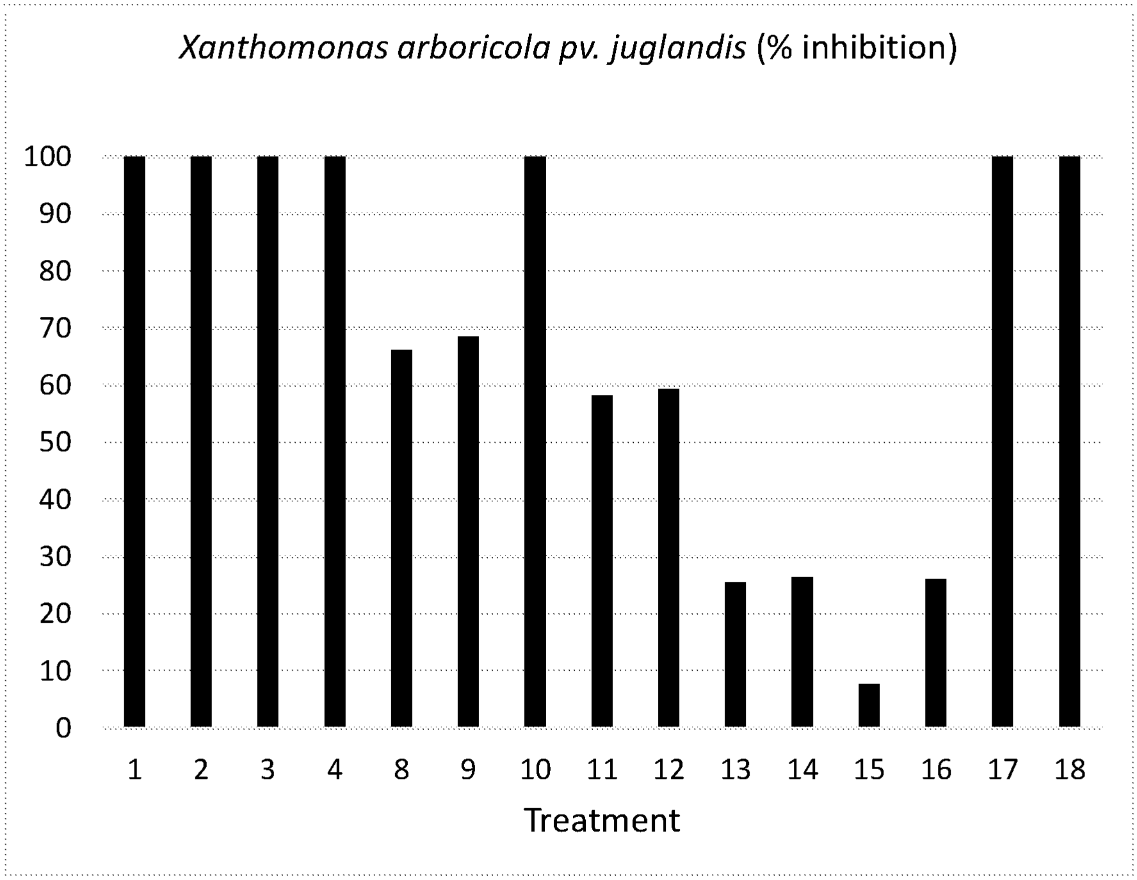
FIG. 8 graphically shows a percentage inhibition of *Xanthomonas arboricola pv. juglandis* after exposure to (or treatment with) compositions of this disclosure and other compounds.

The results obtained from this study are very promising because the majority of the compounds tested here can significantly inhibit a large number of serious plant pathogens. This indicates that after registration of these compounds, growers would have materials that could be effective against multiple important pathogens. The comparison per pathogen is showed at FIG. 1 to FIG. 8.

Field Trials to Evaluate Products Made According the Invention and Comparing Against Existing Products and Standard Treatments Study 1. Evaluate various insecticide formulations, comparing efficacy of a formulation of safe and friendly insecticide on controlling Silverleaf Whitefly (*Bemesia argentifolii*) on Poinsettia, performing in greenhouse.

Methods summary: A bifactorial trial was conducted consisting of 10 treatments, comprised of a combination of 03 insecticides (factor A) and 3 treatment rates (factor B), plus one reference treatment are shown in Table 8.

Insecticides application was done using a single-nozzle type TXVK-4 connected to a backpack $CO_2$ (carbon dioxide) pressurized system. Each plot measured 4 ft×1.5 ft. The control of adults and nymphs was made by collecting and counting each stage. The phytotoxicity evaluation was made 4 days after A, 6 days and 17 days after B, poinsettia was evaluated visually using a 0-10 scale, where 0 corresponds to absence of injury symptoms and 10 corresponds to plant death. Additional information regarding application and other variables of field trials designed are shown in Table 9.

TABLE 8

Field trial design - information regarding products, rates and dosages

| Trt No. | Treatment Name | Form Type | Rate | Rate Unit | Appl Code | Spray Volume | Volume Unit | Mix Size | Mix Unit | Comment |
|---|---|---|---|---|---|---|---|---|---|---|
| 1 | UNTREATED | — | — | — | — | — | — | — | — | — |
| 2 | ABACUS ™ | EC | 4 | fl oz/100 gal | AB | 150 | GAL/AC | 0.5 | liters | 2 @ 7 DAYS |
| 3 | ABACUS ™ | EC | 8 | fl oz/100 gal | AB | 150 | GAL/AC | 0.5 | liters | 2 @ 7 DAYS |
| 4 | ABACUS ™ | EC | 16 | fl oz/100 gal | AB | 150 | GAL/AC | 0.5 | liters | 2 @ 7 DAYS |
| 11 | PREV-AM ® | L | 8 | fl oz/100 gal | AB | 150 | GAL/AC | 0.5 | liters | 2 @ 7 DAYS |
| 12 | PREV-AM ® | L | 16 | fl oz/100 gal | AB | 150 | GAL/AC | 0.5 | liters | 2 @ 7 DAYS |
| 13 | PREV-AM ® | L | 32 | fl oz/100 gal | AB | 150 | GAL/AC | 0.5 | liters | 2 @ 7 DAYS |
| 14 | ORO-296-A | L | 8 | fl oz/100 gal | AB | 150 | GAL/AC | 0.5 | liters | 2 @ 7 DAYS |
| 15 | ORO-296-A | L | 16 | fl oz/100 gal | AB | 150 | GAL/AC | 0.5 | liters | 2 @ 7 DAYS |
| 16 | ORO-296-A | L | 32 | fl oz/100 gal | AB | 150 | GAL/AC | 0.5 | liters | 2 @ 7 DAYS |

TABLE 8-continued

Field trial design - information regarding products, rates and dosages

| Trt No. | Treatment Name | Form Type | Rate | Rate Unit | Appl Code | Spray Volume | Volume Unit | Mix Size | Mix Unit | Comment |
|---|---|---|---|---|---|---|---|---|---|---|
| 20 | SAFARI ™ 20SG | SG | 8 | oz wt/100 gal | AB | 150 | GAL/AC | 0.5 | liters | 2 @ 7 DAYS |
| | CAPSIL ™ | L | 6 | fl oz/100 gal | AB | 150 | GAL/AC | 0.5 | liters | 2 @ 7 DAYS |

Replications: 5;
Untreated treatments: 1;
Design: Randomized Complete Block (RCB)

TABLE 9

Field trial design - Application information

| Reference\application | A | B |
|---|---|---|
| Application Method: | SPRAY | SPRAY |
| Application Timing: | POSPOS | POSPOS |
| Application Placement: | FOLIAR | FOLIAR |
| Equipment Type: | BACSPR | BACSPR |
| Operation Pressure, Unit: | 50 PSI | 50 PSI |
| Nozzle Type: | CONHOL | CONHOL |
| Nozzle Size: | TXVK-4 | TXVK-4 |
| Spray Volume, Unit: | 150 GAL/AC | 150 GAL/AC |
| Mix Size, Unit: | 0.5 L | 0.5 L |
| Propellant: | COMCO2 | COMCO2 |
| Tank Mix (Y/N): | Y yes | Y yes |
| Crop Stage (BBCH scale) | EPHPU BDIC | EPHPU BDIC |
| Pest 1 Code, disc., scale | BEMIAR I | BEMIAR I |
| Application Date: | Nov. 1, 2018 | Nov. 9, 2018 |
| Application start time: | 09:30 AM | 7:15AM |
| Air temperature, unit | 71 F. | 60 F. |
| % Relative Humidity | 17 | 48 |
| Drew presence | N no | N no |
| % Cloud cover | 0 | 0 |

Collection Methodology

Live Adults: Leaf turn method performed by gently turning over a single leaf and counting all living adults on one whole leaf per plot. Leaf selection is on upper strata of plant (younger) where adults are found to be most active.

Nymphs: A total of two discs (one from each plant) measuring 5.64 cm2 each for a total area of 11.28 cm2 is taken form the mid strata of the plant where early instar nymphs are active. Sample discs are then taken into the lab then counted using a stereoscope. The total number of nymphs from the two discs is recorded as a single sub-sample.

TABLE 10

Data collection time and other information

| Type | Time/type of collection |
|---|---|
| 1 | −2 to 0 DA-A/count of live nymphs. |
| 2 | −1 DA-A/count of live adults |

TABLE 10-continued

Data collection time and other information

| Type | Time/type of collection |
|---|---|
| 3 | 0 DA-A/Living adults 3-6 hours after App A |
| 4 | 4 DA-A/count of live nymphs |
| 5 | 7 DA-A/count of live nymphs |
| 6 | 0 DA-B/Living adults 3-6 hours after App B |
| 7 | 7 DA-B/count of live nymphs |
| 8 | 14 DA-B/count of live nymphs |

TABLE 11

General information pest details, site and trials location and information

| | |
|---|---|
| **Pest Description** | |
| Pest 1 Type: | I |
| Code: | BEMIAR (*Bemisia argentifolii*) |
| Common Name: | Silverleaf whitefly |
| Artificial Population: | N |
| **Site and Design** | |
| Site Type: | GREENH (Greenhouse) |
| Treated Plot Width: | 1.5 FT |
| Treated Plot Length: | 4 FT |
| Treated Plot Area: | 6 sq. ft |
| Experimental Unit: | PLOT (plot) |
| **Trial Information** | |
| Trial ID: | US 1 ALEYF 2018 01 |
| Discipline: | I - Insecticide |
| Trial Status: | F - one-year/final |
| Initiation Date: | Nov. 1, 2018 |
| Completion Date: | Nov. 26, 2018 |
| **Trial Location** | |
| City: | Valley Center |
| State/Prov.: | California |
| Country: | USA United States |
| Climate Zone: | USWARM US Warm Continental |
| Latitude of LL Corner °: | 33.27692N |
| Longitude of LL Corner °: | 117.042155 W |
| Altitude of LL Corner, Unit: | 1532.00 FT |

TABLE 12

Evaluation of numbers of nymphs and adults of Silverleaf whitefly - trials 1, 2 and 3

| | | | |
|---|---|---|---|
| Pest Code | BEMIAR | BEMIAR | BEMIAR |
| Pest Scientific Name | *Bemisia* argent> | *Bemisia* argent> | *Bemisia* argent> |
| Pest Name | Silverleaf whi> | Silverleaf whi> | Silverleaf whi> |

TABLE 12-continued

Evaluation of numbers of nymphs and adults of Silverleaf whitefly - trials 1, 2 and 3

| | | | |
|---|---|---|---|
| Crop Scientific Name | *Euphorbia* pulc> | *Euphorbia* pulc> | *Euphorbia* pulc> |
| Crop Name | Common poinset> | Common poinset> | Common poinset> |
| Crop Variety | Prestige Red | Prestige Red | Prestige Red |
| Part Rated | NYMLIV P | ADULIV P | ADULIV P |
| Rating Date | Oct. 30, 2018 | Oct. 31, 2018 | Nov. 1, 2018 |
| Rating Type | COUNT | COUNT | COUNT |
| Rating Unit | NUMBER | NUMBER | NUMBER |
| Number of Subsamples | 1 | 1 | 1 |
| Days After First/Last Applic. | −2 −2 | −1 −1 | 0 0 |
| Trt-Eval Interval | −2 DA-A | −1 DA-A | 0 DA-A |

| Trt Treatment No. Name | Rate Rate Unit | Appl Spray Volume Comment | Trial 1 | Trial 2 | Trial 3 |
|---|---|---|---|---|---|
| 1 UNTREATED | — | — | 92.4 a | 38.5 a | 64.4 a |
| 2 ABACUS ™ | 4 fl oz/ 100 gal | 150 GAL/AC 2 @ 7 DAYS | 89.6 a | 34.9 a | 14.8 b-f |
| 3 ABACUS ™ | 8 fl oz/ 100 gal | 150 GAL/AC 2 @ 7 DAYS | 67.4 a | 22.7 a | 17.0 be |
| 4 ABACUS ™ | 16 fl oz/ 100 gal | 150 GAL/AC 2 @ 7 DAYS | 69.0 a | 22.1 a | 12.3 b-g |
| 11 PREV-AM ® | 8 fl oz/ 100 gal | 150 GAL/AC 2 @ 7 DAYS | 73.2 a | 22.3 a | 17.9 b |
| 12 PREV-AM ® | 16 fl oz/ 100 gal | 150 GAL/AC 2 @ 7 DAYS | 85.4 a | 23.9 a | 14.5 b-f |
| 13 PREV-AM ® | 32 fl oz/ 100 gal | 150 GAL/AC 2 @ 7 DAYS | 72.6 a | 24.4 a | 15.8 b-e |
| 14 OR-296-A | 8 fl oz/ 100 gal | 150 GAL/AC 2 @ 7 DAYS | 82.0 a | 32.5 a | 8.2 c-h |
| 15 OR-296-A | 16 fl oz/ 100 gal | 150 GAL/AC 2 @ 7 DAYS | 68.4 a | 28.7 a | 7.2 f-i |
| 16 OR-296-A | 32 fl oz/ 100 gal | 150 GAL/AC 2 @ 7 DAYS | 67.2 a | 19.8 a | 5.5 hi |
| 20 SAFARI ™ 20SG | 8 oz wt/ 100 gal | 150 GAL/AC 2 @ 7 DAYS | 75.4 a | 26.5 a | 3.2 i |
| CAPSIL ™ | 6 fl oz/ 100 gal | 150 GAL/AC 2 @ 7 DAYS | | | |

| | | | |
|---|---|---|---|
| LSD P = .05 | 41.58 | 15.90-17.11 | 4.28-33.08 |
| Standard Deviation | 33.01 | 0.20t | 0.24t |
| CV | 42.45 | 13.47t | 21.77t |
| Levene's F | 0.86 | 0.751 | 0.888 |
| Levene's Prob(F) | 0.631 | 0.756 | 0.598 |
| Skewness | 0.2774 | 0.3007 | −0.0188 |
| Kurtosis | −0.8178 | 0.3062 | 1.7348* |
| Replicate F | 1.772 | 2.001 | 1.086 |
| Replicate Prob(F) | 0.1432 | 0.1028 | 0.3695 |
| Treatment F | 0.668 | 0.854 | 5.664 |
| Treatment Prob(F) | 0.8386 | 0.6382 | 0.0001 |

TABLE 13

Evaluation of numbers of nymphs and adults of Silverleaf whitefly - trials 4, 6 and 7.

| | | | |
|---|---|---|---|
| Pest Code | BEMIAR | BEMIAR | BEMIAR |
| Pest Scientific Name | *Bemisia* argent> | *Bemisia* argent> | *Bemisia* argent> |
| Pest Name | Silverleaf whi> | Silverleaf whi> | Silverleaf whi> |
| Crop Scientific Name | *Euphorbia* pulc> | *Euphorbia* pulc> | *Euphorbia* pulc> |
| Crop Name | Common poinset> | Common poinset> | Common poinset> |
| Crop Variety | Prestige Red | Prestige Red | Prestige Red |
| Part Rated | NYMLIV P | NYMLIV P | ADULIV P |
| Rating Date | Nov. 5, 2018 | Nov. 8, 2018 | Nov. 9, 2018 |
| Rating Type | COUNT | COUNT | COUNT |
| Rating Unit | NUMBER | NUMBER | NUMBER |

TABLE 13-continued

Evaluation of numbers of nymphs and adults of Silverleaf whitefly - trials 4, 6 and 7.

| Trt Treatment No. Name | Rate/ Rate Unit | Appl Spray Volume Comment | Trial 4 | Trial 6 | Trial 7 |
|---|---|---|---|---|---|
| Number of Subsamples | | | 1 | 1 | 1 |
| Days After First/Last Application | | | 4 4 | 7 7 | 8 8 |
| Trt-Eval Interval | | | 4 DA-A | 7 DA-A | 0 DA-B |
| 1 UNTREATED | — | — | 108.4 a | 274.9 a | 87.8 a |
| 2 ABACUS ™ | 4 fl oz/100 gal | 150 GAL/AC 2 @ 7 DAYS | 104.8 a | 159.5 a | 9.9 d |
| 3 ABACUS ™ | 8 fl oz/100 gal | 150 GAL/AC 2 @ 7 DAYS | 69.7 a | 126.1 a | 12.7 bcd |
| 4 ABACUS ™ | 16 fl oz/100 gal | 150 GAL/AC 2 @ 7 DAYS | 85.7 a | 112.2 a | 13.0 bcd |
| 11 PREV-AM ® | 8 fl oz/100 gal | 150 GAL/AC 2 @ 7 DAYS | 88.1 a | 130.1 a | 10.8 cd |
| 12 PREV-AM ® | 16 fl oz/100 gal | 150 GAL/AC 2 @ 7 DAYS | 65.4 a | 152.2 a | 10.1 cd |
| 13 PREV-AM ® | 32 fl oz/100 gal | 150 GAL/AC 2 @ 7 DAYS | 57.9 a | 123.5 a | 10.6 cd |
| 14 OR-296-A | 8 fl oz/100 gal | 150 GAL/AC 2 @ 7 DAYS | 78.6 a | 142.1 a | 14.0 bcd |
| 15 OR-296-A | 16 fl oz/100 gal | 150 GAL/AC 2 @ 7 DAYS | 82.6 a | 160.8 a | 11.2 bcd |
| 16 OR-296-A | 32 fl oz/100 gal | 150 GAL/AC 2 @ 7 DAYS | 100.1 a | 179.4 a | 10.4 cd |
| 20 SAFARI ™ 20SG | 8 oz wt/100 gal | 150 GAL/AC 2 @ 7 DAYS | 89.5 a | 129.0 a | 3.6 e |
| CAPSIL ™ | 6 fl oz/100 gal | 150 GAL/AC 2 @ 7 DAYS | | | |
| LSD P = .05 | | | 38.74-49.23 | 71.63-89.50 | 5.90-49.88 |
| Standard Deviation | | | 0.17t | 2.35t | 0.28t |
| CV | | | 8.97t | 19.06t | 24.99t |
| Levene's F | | | 0.622 | 0.312 | 0.869 |
| Levene's Prob(F) | | | 0.879 | 0.997 | 0.62 |
| Skewness | | | 0.0337 | 0.1322 | 0.8145* |
| Kurtosis | | | −0.1108 | 0.1368 | 1.3601* |
| Replicate F | | | 2.406 | 10.943 | 1.105 |
| Replicate Prob(F) | | | 0.0567 | 0.0001 | 0.3602 |
| Treatment F | | | 1.265 | 1.628 | 3.759 |
| Treatment Prob(F) | | | 0.2322 | 0.0706 | 0.0001 |

TABLE 14

Evaluation of numbers of nymphs of Silverleaf whitefly - trials 8 and 10.

| Trt Treatment No. Name | Rate Rate Unit | Appl Spray Volume Comment | Trial 8 | Trial 10 |
|---|---|---|---|---|
| Pest Code | | | BEMIAR | BEMIAR |
| Pest Scientific Name | | | *Bemisia* argent> | *Bemisia* argent> |
| Pest Name | | | Silverleaf white fly | Silverleaf white fly |
| Crop Scientific Name | | | *Euphorbia* pulc> | *Euphorbia* pulc> |
| Crop Name | | | Common poinset> | Common poinset> |
| Crop Variety | | | Prestige Red | Prestige Red |
| Part Rated | | | NYMLIV P | NYMLIV P |
| Rating Date | | | Nov. 15, 2018 | Nov. 26, 2018 |
| Rating Type | | | COUNT | COUNT |
| Rating Unit | | | NUMBER | NUMBER |
| Number of Subsamples | | | 1 | 1 |
| Days After First/Last Application | | | 14 6 | 25 17 |
| Trt-Eval Interval | | | 6 DA-B | 6 DA-B |
| 1 UNTREATED | — | — | 156.1 a | 118.4 a |
| 2 ABACUS ™ | 4 fl oz/100 gal | 150 GAL/AC 2 @ 7 DAYS | 81.7 a | 92.8 a |
| 3 ABACUS ™ | 8 fl oz/100 gal | 150 GAL/AC 2 @ 7 DAYS | 57.9 a | 60.9 a |
| 4 ABACUS ™ | 16 fl oz/100 gal | 150 GAL/AC 2 @ 7 DAYS | 51.8 a | 55.6 a |
| 11 PREV-AM ® | 8 fl oz/100 gal | 150 GAL/AC 2 @ 7 DAYS | 61.5 a | 75.5 a |

TABLE 14-continued

Evaluation of numbers of nymphs of Silverleaf whitefly - trials 8 and 10.

| | | | | |
|---|---|---|---|---|
| 12 PREV-AM ® | 16 fl oz/100 gal | 150 GAL/AC 2 @ 7 DAYS | 89.6 a | 68.5 a |
| 13 PREV-AM ® | 32 fl oz/100 gal | 150 GAL/AC 2 @ 7 DAYS | 80.3 a | 81.1 a |
| 14 OR-296-A | 8 fl oz/100 gal | 150 GAL/AC 2 @ 7 DAYS | 81.7 a | 79.2 a |
| 15 OR-296-A | 16 fl oz/100 gal | 150 GAL/AC 2 @ 7 DAYS | 70.3 a | 85.1 a |
| 16 OR-296-A | 32 fl oz/100 gal | 150 GAL/AC 2 @ 7 DAYS | 81.3 a | 50.0 a |
| 20 SAFARI ™ 20SG | 8 oz wt/100 gal | 150 GAL/AC 2 @ 7 DAYS | 42.7 a | 28.4 a |
| CAPSIL ™ | 6 fl oz/100 gal | 150 GAL/AC 2 @ 7 DAYS | | |

| | | |
|---|---|---|
| LSD P = .05 | 51.08-68.70 | 46.64-61.33 |
| Standard Deviation | 2.49t | 2.63t |
| CV | 28.2t | 30.78t |
| Levene's F | 0.45 | 0.37 |
| Levene's Prob(F) | 0.974 | 0.992 |
| Skewness | 0.1761 | 0.4566 |
| Kurtosis | −0.4821 | 0.1163 |
| Replicate F | 1.26 | 1.878 |
| Replicate Prob(F) | 0.293 | 0.123 |
| Treatment F | 1.159 | 1.371 |
| Treatment Prob(F) | 0.3147 | 0.1677 |

TABLE 15

Phytotoxicity evaluation after 5, 9 and 11 days after the second application.

| | | | |
|---|---|---|---|
| Pest Code | BEMIAR | BEMIAR | BEMIAR |
| Pest Scientific Name | *Bemisia* argent> | *Bemisia* argent> | *Bemisia* argent> |
| Pest Name | Silverleaf whi> | Silverleaf whi> | Silverleaf whi> |
| Crop Scientific Name | *Euphorbia* pulc> | *Euphorbia* pulc> | *Euphorbia* pulc> |
| Crop Name | Common poinset> | Common poinset> | Common poinset> |
| Crop Variety | Prestige Red | Prestige Red | Prestige Red |
| Part Rated | PLATOT C | PLATOT C | PLATOT C |
| Rating Date | Nov. 5, 2018 | Nov. 15, 2018 | Nov. 26, 2018 |
| Rating Type | PHYGEN | PHYGEN | PHYGEN |
| Rating Unit | NUMBER | 0-10 | 0-10 |
| Number of Subsamples | 1 | 1 | 1 |
| Days After First/Last Applic. | 4 4 | 14 6 | 25 17 |
| Trt-Eval Interval | 4 DA-A | 6 DA-B | 17 DA-B |

| Trt Treatment No. Name | Rate Rate Unit | Appl Spray Volume Comment | Trial 5 | Trial 9 | Trial 11 |
|---|---|---|---|---|---|
| 1 UNTREATED | — | | 0.0 d | 0.0 d | 0.0 e |
| 2 ABACUS ™ | 4 fl oz/ 100 gal | 150 GAL/AC 2 @ 7 DAYS | 0.0 d | 0.0 d | 0.0 e |
| 3 ABACUS ™ | 8 fl oz/ 100 gal | 150 GAL/AC 2 @ 7 DAYS | 0.0 d | 0.0 d | 0.0 e |
| 4 ABACUS ™ | 16 fl oz/ 100 gal | 150 GAL/AC 2 @ 7 DAYS | 0.0 d | 0.0 d | 0.0 e |
| 11 PREV-AM ® | 8 fl oz/ 100 gal | 150 GAL/AC 2 @ 7 DAYS | 0.0 d | 0.0 d | 0.0 e |
| 12 PREV-AM ® | 16 fl oz/ 100 gal | 150 GAL/AC 2 @ 7 DAYS | 0.0 d | 0.0 d | 0.0 e |
| 13 PREV-AM ® | 32 fl oz/ 100 gal | 150 GAL/AC 2 @ 7 DAYS | 0.0 d | 0.0 d | 0.0 e |
| 14 OR-296-A | 8 fl oz/ 100 gal | 150 GAL/AC 2 @ 7 DAYS | 0.0 d | 0.0 d | 0.0 e |
| 15 OR-296-A | 16 fl oz/ 100 gal | 150 GAL/AC 2 @ 7 DAYS | 0.0 d | 0.0 d | 0.0 e |
| 16 OR-296-A | 32 fl oz/ 100 gal | 150 GAL/AC 2 @ 7 DAYS | 0.8 c | 1.0 c | 1.2 c |

TABLE 15-continued

| Phytotoxicity evaluation after 5, 9 and 11 days after the second application. | | | | | |
|---|---|---|---|---|---|
| 20 SAFARI ™ 20SG | 8 oz wt/ 100 gal | 150 GAL/AC 2 @ 7 DAYS | 0.0 d | 0.0 d | 0.0 e |
| CAPSIL ™ | 6 fl oz/ 100 gal | 150 GAL/AC 2 @ 7 DAYS | | | |

Conclusion a) The results of these greenhouse tests showed that OR-296-A is very effective in control of adults of Silverleaf whitefly, performing similar that the standard treatment SAFARI™20 SG and slightly better than both comparative treatments ABACUS™ and PREV-AM®. The results for control of nymphs was slightly inferior than the standard SAFARI™ and similar than both comparative treatments ABACUS™ and PREV-AM®.

Conclusion b) Phytotoxicity due to any Oro-Agri product application was not observed at any time during the treatments, with initial symptoms occurring in the high dosage (double dosage of the recommendation) of OR-296-A—not significantly.

Conclusion c) The results of these greenhouse tests showed that OR-296-A are very promising in control of adults of Silverleaf whitefly, and considering that this innovative, human and environmental safe compositions performing similar than conventional prior arts, this invention shows high potential to be a safe option to the agricultural market.

Other field trials and greenhouse trials are undergoing to get more data to support this invention.

Study 2. Evaluate various insecticide formulations, comparing efficacy of a formulation of safe and friendly insecticide on controlling Two-spotted spider mite (*Tetranychus urticae*) on Day-lily (*Hemerocallis sp.*), performing in greenhouse. Field trial performed in January and February of 2019.

Methods summary: A bifactorial trial was conducted consisting of 10 treatments, comprised of a combination of 03 insecticides (factor A) and 3 treatment rates (factor B), plus one reference treatment are shown in Table 16.

Plot Design: Each plot consisted of 2 *Hemerocallis* plants which were inoculated with the target pest prior to initiation of the trial. Plots were arranged in a RCB— randomized complete block design in a greenhouse setting. Plants were placed on wire mesh benches spaced on 24" centers. Plant material: Data plants used in the trial were planted into 1 gallon pots. Media used was Sunshine #4 Mix, a peat moss/perlite mix. Irrigation: Plots were irrigated using a low volume spot splitter placed in each container with spray directed at soil surface. Nutrients: Plants were top dressed with a 4-6 mos. controlled released fertilizer. No further nutrients were applied during the trial period. Application: Treatments were applied using a $CO_2$ powered backpack sprayer using a hollow nozzle at 50 psi. A drift hood was placed over each plot while being treated in order to avoid contamination to adjacent plots. Spray application volume was 150 gal/ac which equates to approximately 80 mL/plot. Additional information regarding application and other variables of field trials designed are shown in Table 16.

TABLE 16

Field trial design - information regarding products, rates and dosages

| Trt No. | Treatment Name | Form Type | Rate | Rate Unit | Appl Code | Spray Volume | Volume Unit | Mix Size | Mix Unit | Comment |
|---|---|---|---|---|---|---|---|---|---|---|
| 1 | UNTREATED | — | — | — | — | — | — | — | — | — |
| 2 | ABACUS ™ | EC | 4 | fl oz/100 gal | AB | 150 | GAL/AC | 0.5 | liters | 2 @ 7 DAYS |
| 3 | ABACUS ™ | EC | 8 | fl oz/100 gal | AB | 150 | GAL/AC | 0.5 | liters | 2 @ 7 DAYS |
| 4 | ABACUS ™ | EC | 16 | fl oz/100 gal | AB | 150 | GAL/AC | 0.5 | liters | 2 @ 7 DAYS |
| 11 | PREV-AM ® | L | 8 | fl oz/100 gal | AB | 150 | GAL/AC | 0.5 | liters | 2 @ 7 DAYS |
| 12 | PREV-AM ® | L | 16 | fl oz/100 gal | AB | 150 | GAL/AC | 0.5 | liters | 2 @ 7 DAYS |
| 13 | PREV-AM ® | L | 32 | fl oz/100 gal | AB | 150 | GAL/AC | 0.5 | liters | 2 @ 7 DAYS |
| 14 | ORO-296-A | L | 8 | fl oz/100 gal | AB | 150 | GAL/AC | 0.5 | liters | 2 @ 7 DAYS |
| 15 | ORO-296-A | L | 16 | fl oz/100 gal | AB | 150 | GAL/AC | 0.5 | liters | 2 @ 7 DAYS |
| 16 | ORO-296-A | L | 32 | fl oz/100 gal | AB | 150 | GAL/AC | 0.5 | liters | 2 @ 7 DAYS |
| 20 | QR-009-K | L | 0.4 | % v/v | AB | 150 | GAL/AC | 0.5 | liters | 2 @ 7 DAYS |

Replications: 4;

Untreated treatments: 1;

Design: Randomized Complete Block (RCB)

TABLE 17

| Field trial design - Application information | | |
|---|---|---|
| Reference\application | A | B |
| Application Method: | SPRAY | SPRAY |
| Application Timing: | POSPOS | POSPOS |
| Application Placement: | FOLIAR | FOLIAR |
| Equipment Type: | BACSPR | BACSPR |
| Operation Pressure, Unit: | 50 PSI | 50 PSI |
| Nozzle Type: | CONHOL | CONHOL |
| Nozzle Size: | TXVK-4 | TXVK-4 |
| Spray Volume, Unit: | 150 GAL/AC | 150 GAL/AC |
| Mix Size, Unit: | 0.5 L | 0.5 L |
| Propellant: | COMCO2 | COMCO2 |
| Tank Mix (Y/N): | Y yes | Y yes |
| Crop Stage (BBCH scale) | HEGSS BMON | HEGSS MON |
| Pest 1 Code, disc., scale | TETRUR I | TETRUR I |
| Application Date: | Jan. 19, 2019 | Jan. 26, 2019 |
| Application start time: | 07:00 AM | 10:00 AM |
| Air temperature, unit | 62 F. | 81 F. |
| % Relative Humidity | 77 | 17 |
| Drew presence | N no | N no |
| % Cloud cover | 0 | 0 |

Collection Methodology

Two leaves measuring 5"L×1"W were collected from each plot. Leaves were then brushed using a mite brushing machine and viewed under a stereoscope. The pest nymphs (NYMLIV P) and adults (ADULIV P) were counted separately and reported individually and as a combined count of total motiles (MOTILE P).

TABLE 18

| Data collection time and other information | |
|---|---|
| Type | Time/type of collection |
| 1 | −2 to 0 DA-A/count of live adults. |
| 2 | 3 DA-A/count of live adults after App A |
| 3 | 6 DA-A/count of live adults after App A |
| 4 | 3 DA-B/count of live adults after App B |
| 5 | 6 DA-B/count of live adults after App B |

TABLE 18-continued

| Data collection time and other information | |
|---|---|
| Type | Time/type of collection |
| 6 | 13 DA-B/count of live adults after App B |
| 7 | 6 DA-B/count of motiles totals after App B |
| 8 | 13 DA-B/count of motiles totals after App B |

TABLE 19

| General information pest details, site and trials location and information | |
|---|---|
| **Pest Description** | |
| Pest 1 Type: | I Insect |
| Code: | TETRUR (*tetranychus urticae*) |
| Common Name: | Day-lily (*Hemerocallis* sp.) |
| Artificial Population: | N no |
| **Site and Design** | |
| Site Type: | GREENH (Greenhouse) |
| Treated Plot Width: | 1.5 FT |
| Treated Plot Length: | 4 FT |
| Treated Plot Area: | 6 sq. ft |
| Experimental Unit: | PLOT (plot) |
| **Trial Information** | |
| Trial ID: | 18-ORO-TSSM |
| Discipline: | I - Insecticide |
| Trial Status: | F - one-year/final |
| Initiation Date: | Jan. 19, 2019 |
| Completion Date: | Fev-08-2019 |
| **Trial Location** | |
| City: | Valley Center |
| State/Prov.: | California |
| Country: | USA United States |
| Climate Zone: | USWARM US Warm Continental |
| Latitude of LL Corner °: | 33.27692 N |
| Longitude of LL Corner °: | 117.042155 W |
| Altitude of LL Corner, Unit: | 1532.00 FT |

TABLE 20

Evaluation of numbers of adults of Two-spotted spider mite - trials 2, 5, 8 and 11.

| | | | | |
|---|---|---|---|---|
| Pest Code | TETRUR | TETRUR | TETRUR | TETRUR |
| Pest Scientific Name | *Tetranychus* ur> | *Tetranychus* ur> | *Tetranychus* ur> | *Tetranychus* ur> |
| Pest Name | Two-spotted spider mite> | Two-spotted spider mite> | Two-spotted spider mite> | Two-spotted spider mite> |
| Crop Scientific Name | *Hemerocallis* sp.> | *Hemerocallis* sp.> | *Hemerocallis* sp.> | *Hemerocallis* sp.> |
| Crop Name | Day-lily> | Day-lily> | Day-lily> | Day-lily> |
| Crop Variety | Yangstizer | Yangstizer | Yangstizer | Yangstizer |
| Part Rated | ADULTLIV P | ADULTLIV P | ADULTLIV P | ADULTLIV P |
| Rating Date | Jan. 17, 2019 | Jan. 22, 2019 | Jan. 25, 2019 | Jan. 29, 2019 |
| Rating Type | COUNT | COUNT | COUNT | COUNT |
| Rating Unit | NUMBER | NUMBER | NUMBER | NUMBER |
| Number of Subsamples | 1 | 1 | 1 | 1 |
| Days After First/Last Applic. | −2 −2 | 3 3 | 6 6 | 10 3 |
| Trt-Eval Interval | −2 DA-A | 3 DA-A | 6 DA-A | 3 DA-B |

| Trt Treatment No. Name | Rate Rate Unit | Appl Spray Volume Comment | Trial 2 | Trial 5 | Trial 8 | Trial 11 |
|---|---|---|---|---|---|---|
| 1 UNTREATED | — | — | 53.9a | 48.0a | 51.0a | 83.4a |
| 2 ABACUS ™ | 4 fl oz/ 100 gal | 150 GAL/AC 2 @ 7 DAYS | 82.8a | 15.0a | 11.4a | 21.7a |
| 3 ABACUS ™ | 8 fl oz/ 100 gal | 150 GAL/AC 2 @ 7 DAYS | 52.2a | 30.0a | 18.9a | 44.8a |

TABLE 20-continued

Evaluation of numbers of adults of Two-spotted spider mite - trials 2, 5, 8 and 11.

| | | | | | | |
|---|---|---|---|---|---|---|
| 4 ABACUS ™ | 16 fl oz/ 100 gal | 150 GAL/AC 2 @ 7 DAYS | 65.4a | 36.0a | 10.6a | 43.9a |
| 11 PREV-AM ® | 8 fl oz/ 100 gal | 150 GAL/AC 2 @ 7 DAYS | 50.3a | 48.0a | 50.2a | 23.9a |
| 12 PREV-AM ® | 16 fl oz/ 100 gal | 150 GAL/AC 2 @ 7 DAYS | 57.0a | 78.0a | 23.2a | 44.5a |
| 13 PREV-AM ® | 32 fl oz/ 100 gal | 150 GAL/AC 2 @ 7 DAYS | 82.3a | 33.0a | 43.7a | 47.0a |
| 14 OR-296-A | 8 fl oz/ 100 gal | 150 GAL/AC 2 @ 7 DAYS | 39.3a | 72.0a | 35.1a | 36.5a |
| 15 OR-296-A | 16 fl oz/ 100 gal | 150 GAL/AC 2 @ 7 DAYS | 101.6a | 60.0a | 25.5a | 67.9a |
| 16 OR-296-A | 32 fl oz/ 100 gal | 150 GAL/AC 2 @ 7 DAYS | 88.2a | 45.0a | 25.9a | 31.5a |
| 20 OR-009-K | 0.4% v/v | 150 GAL/AC 2 @ 7 DAYS | 35.4a | 33.0a | 38.3a | 46.3A |
| LSD P = .05 | | | 68.33-69.91 | 36.87 | 31.09-35.39 | 41.16-48.96 |
| Standard Deviation | | | 3.04t | 26.07 | 2.24t | 2.30t |
| CV | | | 37.88t | 57.74 | 43.32t | 34.88t |
| Levene's F | | | 0.65 | 1.002 | 0.686 | 0.915 |
| Levene's Prob(F) | | | 0.858 | 0.472 | 0.824 | 0.57 |
| Skewness | | | 0.3043 | 0.1691 | −0.1182 | −0.2343 |
| Kurtosis | | | −0.0528 | −0.6403 | 0.2676 | 1.0219 |
| Replicate F | | | 4.770 | 2.005 | 2.013 | 0.625 |
| Replicate Prob(F) | | | 0.0048 | 0.1229 | 0.1216 | 0.6018 |
| Treatment F | | | 0.618 | 1.205 | 1.001 | 1.079 |
| Treatment Prob(F) | | | 0.8838 | 0.2822 | 0.4743 | 0.3943 |

TABLE 21

Evaluation of numbers of adults of Two-spotted spider mite - trials 14 and 17.

| | | | | |
|---|---|---|---|---|
| Pest Code | | | TETRUR | TETRUR |
| Pest Scientific Name | | | *Tetranychus* ur> | *Tetranychus* ur> |
| Pest Name | | | Two-spotted spider mite> | Two-spotted spider mite> |
| Crop Scientific Name | | | *Hemerocallis* sp.> | *Hemerocallis* sp.> |
| Crop Name | | | Day-lily> | Day-lily> |
| Crop Variety | | | Yangstizer | Yangstizer |
| Part Rated | | | ADULTLIV P | ADULTLIV P |
| Rating Date | | | Feb. 1, 2019 | Feb. 8, 2019 |
| Rating Type | | | COUNT | COUNT |
| Rating Unit | | | NUMBER | NUMBER |
| Number of Subsamples | | | 1 | 1 |
| Days After First/Last Application | | | 13 6 | 20 13 |
| Trt-Eval Interval | | | 6 DA-B | 13 DA-B |
| Trt Treatment No. Name | Rate/ Rate Unit | Appl Spray Volume Comment | Trial 14 | Trial 17 |
| 1 UNTREATED | — | — | 99.6a | 151.1a |
| 2 ABACUS ™ | 4 fl oz/ 100 gal | 150 GAL/AC 2 @ 7 DAYS | 16.2a | 40.0a |
| 3 ABACUS ™ | 8 fl oz/ 100 gal | 150 GAL/AC 2 @ 7 DAYS | 43.9a | 40.0a |
| 4 ABACUS ™ | 16 fl oz/ 100 gal | 150 GAL/AC 2 @ 7 DAYS | 65.3a | 38.8a |

TABLE 21-continued

Evaluation of numbers of adults of Two-spotted spider mite - trials 14 and 17.

| | | | | |
|---|---|---|---|---|
| 11 PREV-AM ® | 8 fl oz/ 100 gal | 150 GAL/AC 2 @ 7 DAYS | 59.7a | 75.8a |
| 12 PREV-AM ® | 16 fl oz/ 100 gal | 150 GAL/AC 2 @ 7 DAYS | 76.7a | 92.0a |
| 13 PREV-AM ® | 32 fl oz/ 100 gal | 150 GAL/AC 2 @ 7 DAYS | 66.5a | 70.5a |
| 14 OR-296-A | 8 fl oz/ 100 gal | 150 GAL/AC 2 @ 7 DAYS | 67.5a | 64.1a |
| 15 OR-296-A | 16 fl oz/ 100 gal | 150 GAL/AC 2 @ 7 DAYS | 50.5a | 68.6a |
| 16 OR-296-A | 32 fl oz/ 100 gal | 150 GAL/AC 2 @ 7 DAYS | 40.9a | 35.5a |
| 20 QR-009-K | 0.4% v/v | 150 GAL/AC 2 @ 7 DAYS | 66.3a | 53.3a |
| LSD P = .05 | | | 39.47-56.61 | 52.13-73.51 |
| Standard Deviation | | | 2.41t | 2.46t |
| CV | | | 32.62t | 32.74t |
| Levene's F | | | 1.126 | 1.088 |
| Levene's Prob(F) | | | 0.348 | 0.384 |
| Skewness | | | 0.213 | 0.0254 |
| Kurtosis | | | 0.8072 | 0.0091 |
| Replicate F | | | 0.668 | 5.037 |
| Replicate Prob(F) | | | 0.5749 | 0.0035 |
| Treatment F | | | 1.444 | 1.726 |
| Treatment Prob(F) | | | 0.1382 | 0.0540 |

TABLE 22

Evaluation of numbers of motiles of Two-spotted spider mite - trials 3, 6, 9 and 12.

| | | | | |
|---|---|---|---|---|
| Pest Code | TETRUR | TETRUR | TETRUR | TETRUR |
| Pest Scientific Name | *Tetranychus* ur> | *Tetranychus* ur> | *Tetranychus* ur> | *Tetranychus* ur> |
| Pest Name | Two-spotted spider mite> | Two-spotted spider mite> | Two-spotted spider mite> | Two-spotted spider mite> |
| Crop Scientific Name | *Hemerocallis* sp.> | *Hemerocallis* sp.> | *Hemerocallis* sp.> | *Hemerocallis* sp.> |

TABLE 22-continued

Evaluation of numbers of motiles of Two-spotted spider mite - trials 3, 6, 9 and 12.

| | | | | |
|---|---|---|---|---|
| Crop Name | Day-lily> | Day-lily> | Day-lily> | Day-lily> |
| Crop Variety | Yangstizer | Yangstizer | Yangstizer | Yangstizer |
| Part Rated | MOTILES P | MOTILES P | MOTILES P | MOTILES P |
| Rating Date | Jan. 17, 2019 | Jan. 22, 2019 | Jan. 25, 2019 | Jan. 29, 2019 |
| Rating Type | COUNT | COUNT | COUNT | COUNT |
| Rating Unit | NUMBER | NUMBER | NUMBER | NUMBER |
| Number of Subsamples | 1 | 1 | 1 | 1 |
| Days After First/Last Applic. | −2 −2 | 3 3 | 6 6 | 10 3 |
| Trt-Eval Interval | −2 DA-A | 3 DA-A | 6 DA-A | 3 DA-B |

| Trt Treatment No. Name | Rate Rate Unit | Appl Spray Volume Comment | Trial 3 | Trial 6 | Trial 9 | Trial 12 |
|---|---|---|---|---|---|---|
| 1 UNTREATED | — | — | 338.0a | 338.0a | 338.0a | 338.0a |
| 2 ABACUS ™ | 4 fl oz/ 100 gal | 150 GAL/AC 2 @ 7 DAYS | 495.0a | 495.0a | 495.0a | 495.0a |
| 3 ABACUS ™ | 8 fl oz/ 100 gal | 150 GAL/AC 2 @ 7 DAYS | 267.0a | 267.0a | 267.0a | 267.0a |
| 4 ABACUS ™ | 16 fl oz/ 100 gal | 150 GAL/AC 2 @ 7 DAYS | 309.0a | 309.0a | 309.0a | 309.0a |
| 11 PREV-AM ® | 8 fl oz/ 100 gal | 150 GAL/AC 2 @ 7 DAYS | 194.7a | 194.7a | 194.7a | 194.7a |
| 12 PREV-AM ® | 16 fl oz/ 100 gal | 150 GAL/AC 2 @ 7 DAYS | 117.2a | 117.2a | 117.2a | 117.2a |
| 13 PREV-AM ® | 32 fl oz/ 100 gal | 150 GAL/AC 2 @ 7 DAYS | 151.9a | 151.9a | 151.9a | 151.9a |
| 14 OR-296-A | 8 fl oz/ 100 gal | 150 GAL/AC 2 @ 7 DAYS | 147.9a | 147.9a | 147.9a | 147.9a |
| 15 OR-296-A | 16 fl oz/ 100 gal | 150 GAL/AC 2 @ 7 DAYS | 237.7a | 237.7a | 237.7a | 237.7a |
| 16 OR-296-A | 32 fl oz/ 100 gal | 150 GAL/AC 2 @ 7 DAYS | 73.4a | 73.4a | 73.4a | 73.4a |
| 20 OR-009-K | 0.4% v/v | 150 GAL/AC 2 @ 7 DAYS | 252.0a | 172.8a | 175.9a | 116.4a |

| | | | | |
|---|---|---|---|---|
| LSD P = .05 | 192.34 | 128.51-142.58 | 67.02-113.09 | 92.03-99.81 |
| Standard Deviation | 135.98 | 3.42t | 0.20t | 2.88t |
| CV | 39.32 | 25.0t | 9.36t | 25.37t |
| Levene's F | 1.558 | 0.575 | 0.38 | 0.703 |
| Levene's Prob(F) | 0.093 | 0.916 | 0.991 | 0.808 |
| Skewness | 0.4091 | 0.1011 | 0.1331 | 0.3974 |
| Kurtosis | −0.7171 | −0.2663 | 0.0587 | 0.5896 |
| Replicate F | 16.075 | 2.325 | 1.238 | 2.073 |
| Replicate Prob(F) | 0.0001 | 0.0838 | 0.3040 | 0.1133 |
| Treatment F | 0.931 | 0.780 | 1.315 | 0.736 |
| Treatment Prob(F) | 0.5524 | 0.7258 | 0.2057 | 0.7733 |

TABLE 23

Evaluation of numbers and control of motiles of Two-spotted spider mite - trials 15, 18, 19 and 20.

| | | | | |
|---|---|---|---|---|
| Pest Code | TETRUR | TETRUR | TETRUR | TETRUR |
| Pest Scientific Name | *Tetranychus* ur> | *Tetranychus* ur> | *Tetranychus* ur> | *Tetranychus* ur> |
| Pest Name | Two-spotted spider mite> | Two-spotted spider mite> | Two-spotted spider mite> | Two-spotted spider mite> |
| Crop Scientific Name | *Hemerocallis* sp.> | *Hemerocallis* sp.> | *Hemerocallis* sp.> | *Hemerocallis* sp.> |
| Crop Name | Day-lily> | Day-lily> | Day-lily> | Day-lily> |
| Crop Variety | Yangstizer | Yangstizer | Yangstizer | Yangstizer |
| Part Rated | MOTILES P | MOTILES P | MOTILES P | MOTILES P |
| Rating Date | Feb. 1, 2019 | Feb. 8, 2019 | Jan. 17, 2019 | Jan. 22, 2019 |
| Rating Type | COUNT | COUNT | CONTROL | CONTROL |
| Rating Unit | NUMBER | NUMBER | % UNCK | % UNCK |
| Number of Subsamples | 1 | 1 | 1 | 1 |
| Days After First/Last Applic. | 13 6 | 20 13 | −2 −2 | 3 3 |
| Trt-Eval Interval | 6 DA-B | 13 DA-B | −2 DA-A | 3 DA-A |

TABLE 23-continued

Evaluation of numbers and control of motiles of Two-spotted spider mite - trials 15, 18, 19 and 20.

| Trt No. Treatment Name | Rate Rate Unit | Appl Spray Volume Comment | Trial 15 | Trial 18 | Trial 19 | Trial 20 |
|---|---|---|---|---|---|---|
| 1 UNTREATED | — | — | 308.1ab | 818.0a | 0a | 0a |
| 2 ABACUS ™ | 4 fl oz/ 100 gal | 150 GAL/AC 2 @ 7 DAYS | 142.3cde | 197.5cde | | |
| 3 ABACUS ™ | 8 fl oz/ 100 gal | 150 GAL/AC 2 @ 7 DAYS | 190.5a-d | 143.9de | | |
| 4 ABACUS ™ | 16 fl oz/ 100 gal | 150 GAL/AC 2 @ 7 DAYS | 232.5a-d | 242.8b-e | | |
| 11 PREV-AM ® | 8 fl oz/ 100 gal | 150 GAL/AC 2 @ 7 DAYS | 240.3a-d | 370.3bcd | | |
| 12 PREV-AM ® | 16 fl oz/ 100 gal | 150 GAL/AC 2 @ 7 DAYS | 238.4a-d | 451.6abc | | |
| 13 PREV-AM ® | 32 fl oz/ 100 gal | 150 GAL/AC 2 @ 7 DAYS | 336.5a | 287.3b-e | | |
| 14 OR-296-A | 8 fl oz/ 100 gal | 150 GAL/AC 2 @ 7 DAYS | 264.6abc | 443.6abc | | |
| 15 OR-296-A | 16 fl oz/ 100 gal | 150 GAL/AC 2 @ 7 DAYS | 128.6cde | 318.3b-e | | |
| 16 OR-296-A | 32 fl oz/ 100 gal | 150 GAL/AC 2 @ 7 DAYS | 189.6a-d | 239.1b-e | | |
| 20 OR-009-K | 0.4% v/v | 150 GAL/AC 2 @ 7 DAYS | 145.7cde | 169.3de | | |

| | Trial 15 | Trial 18 | Trial 19 | Trial 20 |
|---|---|---|---|---|
| LSD P = .05 | 86.94-175.76 | 220.77-376.24 | — | — |
| Standard Deviation | 0.23t | 5.36t | NaN | NaN |
| CV | 9.97t | 32.28t | 0.0t | 0.0t |
| Levene's F | 0.477 | 1.086 | 0.00 | 0.00 |
| Levene's Prob(F) | 0.966 | 0.386 | 0.00* | 0.00* |
| Skewness | 0.2018 | 0.5349* | — | — |
| Kurtosis | −0.6142 | 0.1759 | — | — |
| Replicate F | 3.939 | 4.324 | 0.000 | 0.000 |
| Replicate Prob(F) | 0.0124 | 0.0080 | 1.0000 | 1.0000 |
| Treatment F | 1.774 | 2.656 | 0.000 | 0.000 |
| Treatment Prob(F) | 0.0457 | 0.0019 | 1.0000 | 1.0000 |

TABLE 24

Evaluation of % control of motiles of Two-spotted spider mite - trials 21, 22, 23 and 24.

| | | | | |
|---|---|---|---|---|
| Pest Code | TETRUR | TETRUR | TETRUR | TETRUR |
| Pest Scientific Name | *Tetranychus* ur> | *Tetranychus* ur> | *Tetranychus* ur> | *Tetranychus* ur> |
| Pest Name | Two-spotted spider mite> | Two-spotted spider mite> | Two-spotted spider mite> | Two-spotted spider mite> |
| Crop Scientific Name | *Hemerocallis* sp.> | *Hemerocallis* sp.> | *Hemerocallis* sp.> | *Hemerocallis* sp.> |
| Crop Name | Day-lily> | Day-lily> | Day-lily> | Day-lily> |
| Crop Variety | Yangstizer | Yangstizer | Yangstizer | Yangstizer |
| Part Rated | MOTILES P | MOTILES P | MOTILES P | MOTILES P |
| Rating Date | Jan. 25, 2019 | Jan. 29, 2019 | Feb. 1, 2019 | Feb. 8, 2019 |
| Rating Type | CONTROL | CONTROL | CONTROL | CONTROL |
| Rating Unit | % UNCK | % UNCK | % UNCK | % UNCK |
| Number of Subsamples | 1 | 1 | 1 | 1 |
| Days After First/Last Applic. | 6 6 | 10 3 | 13 6 | 20 13 |
| Trt-Eval Interval | 6 DA-A | 3 DA-B | 6 DA-B | 13 DA-B |

| Trt No. Treatment Name | Rate Rate Unit | Appl Spray Volume Comment | Trial 21 | Trial 22 | Trial 23 | Trial 24 |
|---|---|---|---|---|---|---|
| 1 UNTREATED | — | — | 0 | 0a | 0a | 0f |
| 2 ABACUS ™ | 4 fl oz/ 100 gal | 150 GAL/AC 2 @ 7 DAYS | 68a | 47a | 38a | 75ab |
| 3 ABACUS ™ | 8 fl oz/ 100 gal | 150 GAL/AC 2 @ 7 DAYS | 33a | 65a | 16a | 75ab |
| 4 ABACUS ™ | 16 fl oz/ 100 gal | 150 GAL/AC 2 @ 7 DAYS | 22a | 52a | 19a | 72abc |
| 11 PREV-AM ® | 8 fl oz/ 100 gal | 150 GAL/AC 2 @ 7 DAYS | 31a | 50a | 12a | 50a-e |

TABLE 24-continued

Evaluation of % control of motiles of Two-spotted spider mite - trials 21, 22, 23 and 24.

| | | | | | | |
|---|---|---|---|---|---|---|
| 12 PREV-AM ® | 16 fl oz/ 100 gal | 150 GAL/AC 2 @ 7 DAYS | 42a | 45a | 13a | 37b-f |
| 13 PREV-AM ® | 32 fl oz/ 100 gal | 150 GAL/AC 2 @ 7 DAYS | 34a | 44a | 8a | 64a-d |
| 14 OR-296-A | 8 fl oz/ 100 gal | 150 GAL/AC 2 @ 7 DAYS | 36a | 43a | 28a | 19ef |
| 15 OR-296-A | 16 fl oz/ 100 gal | 150 GAL/AC 2 @ 7 DAYS | 28a | 29a | 39a | 31c-f |
| 16 OR-296-A | 32 fl oz/ 100 gal | 150 GAL/AC 2 @ 7 DAYS | 57a | 67a | 24a | 67abc |
| 20 QR-009-K | 0.4% v/v | 150 GAL/AC 2 @ 7 DAYS | 23a | 45a | 35a | 77ab |
| LSD P = .05 | | | 47.2-48.2 | 41.2 | 35.5-48.3 | 43.5 |
| Standard Deviation | | | 2.6t | 25.0 | 2.6t | 30.7 |
| CV | | | 42.63t | 54.85 | 53.44t | 53.93 |
| Levene's F | | | 0.673 | 3.111 | 0.624 | 1.001 |
| Levene's Prob(F) | | | 0.83 | 0.001* | 0.88 | 0.473 |
| Skewness | | | −1.2443* | −0.8109* | −0.3116 | −2.3159* |
| Kurtosis | | | 0.5107 | 0.1359 | −1.7107* | 7.199* |
| Replicate F | | | 6.748 | 7.737 | 26.858 | 5.289 |
| Replicate Prob(F) | | | 0.0006 | 0.0014 | 0.0001 | 0.0028 |
| Treatment F | | | 0.603 | 1.469 | 1.534 | 2.402 |
| Treatment Prob(F) | | | 0.8888 | 0.1479 | 0.1031 | 0.0057 |

TABLE 25

Evaluation of numbers of nymphs of Two-spotted spider mite - trials 1, 4, 7 and 10.

| | | | | |
|---|---|---|---|---|
| Pest Code | TETRUR | TETRUR | TETRUR | TETRUR |
| Pest Scientific Name | *Tetranychus* ur> | *Tetranychus* ur> | *Tetranychus* ur> | *Tetranychus* ur> |
| Pest Name | Two-spotted spider mite> | Two-spotted spider mite> | Two-spotted spider mite> | Two-spotted spider mite> |
| Crop Scientific Name | *Hemerocallis* sp.> | *Hemerocallis* sp.> | *Hemerocallis* sp.> | *Hemerocallis* sp.> |
| Crop Name | Day-lily> | Day-lily> | Day-lily> | Day-lily> |
| Crop Variety | Yangstizer | Yangstizer | Yangstizer | Yangstizer |
| Part Rated | NYMLIV P | NYMLIV P | NYMLIV P | NYMLIV P |
| Rating Date | Jan. 17, 2019 | Jan. 22, 2019 | Jan. 25, 2019 | Jan. 29, 2019 |
| Rating Type | COUNT | COUNT | COUNT | COUNT |
| Rating Unit | NUMBER | NUMBER | NUMBER | NUMBER |
| Number of Subsamples | 1 | 1 | 1 | 1 |
| Days After First/Last Applic. | −2 −2 | 3 3 | 6 6 | 10 3 |
| Trt-Eval Interval | −2 DA-A | 3 DA-A | 6 DA-A | 3 DA-B |

| Trt Treatment No. Name | Rate Rate Unit | Appl Spray Volume Comment | Trial 1 | Trial 4 | Trial 7 | Trial 10 |
|---|---|---|---|---|---|---|
| 1 UNTREATED | — | — | 281.0a | 144.9a | 187.5a | 118.5a |
| 2 ABACUS ™ | 4 fl oz/ 100 gal | 150 GAL/AC 2 @ 7 DAYS | 405.0a | 104.5a | 59.7a | 104.8a |
| 3 ABACUS ™ | 8 fl oz/ 100 gal | 150 GAL/AC 2 @ 7 DAYS | 204.0a | 124.3a | 109.3a | 95.5a |
| 4 ABACUS ™ | 16 fl oz/ 100 gal | 150 GAL/AC 2 @ 7 DAYS | 240.0a | 115.8a | 142.7a | 104.6a |
| 11 PREV-AM ® | 8 fl oz/ 100 gal | 150 GAL/AC 2 @ 7 DAYS | 273.0a | 187.4a | 108.3a | 98.1a |
| 12 PREV-AM ® | 16 fl oz/ 100 gal | 150 GAL/AC 2 @ 7 DAYS | 291.0a | 215.2a | 107.5a | 77.0a |
| 13 PREV-AM ® | 32 fl oz/ 100 gal | 150 GAL/AC 2 @ 7 DAYS | 276.0a | 118.7a | 92.6a | 88.0a |
| 14 OR-296-A | 8 fl oz/ 100 gal | 150 GAL/AC 2 @ 7 DAYS | 192.0a | 176.3a | 88.1a | 77.8a |
| 15 OR-296-A | 16 fl oz/ 100 gal | 150 GAL/AC 2 @ 7 DAYS | 321.0a | 140.9a | 110.9a | 74.5a |
| 16 OR-296-A | 32 fl oz/ 100 gal | 150 GAL/AC 2 @ 7 DAYS | 237.0a | 104.0a | 58.8a | 59.8a |
| 20 OR-009-K | 0.4% v/v | 150 GAL/AC 2 @ 7 DAYS | 207.0a | 143.1a | 142.8a | 64.5a |

TABLE 25-continued

| Evaluation of numbers of nymphs of Two-spotted spider mite - trials 1, 4, 7 and 10. | | | | |
|---|---|---|---|---|
| LSD P = .05 | 153.13 | 111.29-111.34 | 65.55-83.17 | 64.88-66.01 |
| Standard Deviation | 108.27 | 3.16t | 2.46t | 2.57t |
| CV | 39.73 | 26.29t | 23.99t | 28.38t |
| Levene's F | 1.366 | 0.515 | 0.576 | 1.103 |
| Levene's Prob(F) | 0.174 | 0.95 | 0.915 | 0.37 |
| Skewness | 0.4273 | 0.3945 | 0.8885* | 0.4235 |
| Kurtosis | −0.8035 | −0.3637 | 1.9427* | 0.086 |
| Replicate F | 16.842 | 2.047 | 2.690 | 4.298 |
| Replicate Prob(F) | 0.0001 | 0.1169 | 0.0542 | 0.0082 |
| Treatment F | 0.962 | 0.625 | 1.285 | 0.630 |
| Treatment Prob(F) | 0.5175 | 0.8784 | 0.2247 | 0.8740 |

TABLE 26

Evaluation of numbers of nymphs of Two-spotted spider mite - trials 13 and 16.

| Trt Treatment No. Name | Rate/Rate Unit | Appl Spray Volume Comment | Trial 13 | Trial 16 |
|---|---|---|---|---|
| Pest Code | | | TETRUR | TETRUR |
| Pest Scientific Name | | | *Tetranychus* ur> | *Tetranychus* ur> |
| Pest Name | | | Two-spotted spider mite> | Two-spotted spider mite> |
| Crop Scientific Name | | | *Hemerocallis* sp.> | *Hemerocallis* sp.> |
| Crop Name | | | Day-lily> | Day-lily> |
| Crop Variety | | | Yangstizer | Yangstizer |
| Part Rated | | | NYMLIV P | NYMLIV P |
| Rating Date | | | Feb. 1, 2019 | Feb. 8, 2019 |
| Rating Type | | | COUNT | COUNT |
| Rating Unit | | | NUMBER | NUMBER |
| Number of Subsamples | | | 1 | 1 |
| Days After First/Last Application | | | 13 6 | 20 13 |
| Trt-Eval Interval | | | 6 DA-B | 13 DA-B |
| 1 UNTREATED | — | — | 238.2a | 660.8a |
| 2 ABACUS ™ | 4 fl oz/ 100 gal | 150 GAL/AC 2 @ 7 DAYS | 125.6a | 154.0c-f |
| 3 ABACUS ™ | 8 fl oz/ 100 gal | 150 GAL/AC 2 @ 7 DAYS | 153.6a | 102.4ef |
| 4 ABACUS ™ | 16 fl oz/ 100 gal | 150 GAL/AC 2 @ 7 DAYS | 175.4a | 199.6b-f |
| 11 PREV-AM ® | 8 fl oz/ 100 gal | 150 GAL/AC 2 @ 7 DAYS | 188.3a | 288.1b-e |
| 12 PREV-AM ® | 16 fl oz/ 100 gal | 150 GAL/AC 2 @ 7 DAYS | 163.8a | 357.2abc |
| 13 PREV-AM ® | 32 fl oz/ 100 gal | 150 GAL/AC 2 @ 7 DAYS | 274.2a | 215.7b-f |
| 14 OR-296-A | 8 fl oz/ 100 gal | 150 GAL/AC 2 @ 7 DAYS | 201.7a | 378.7abc |
| 15 OR-296-A | 16 fl oz/ 100 gal | 150 GAL/AC 2 @ 7 DAYS | 79.5a | 233.7b-f |
| 16 OR-296-A | 32 fl oz/ 100 gal | 150 GAL/AC 2 @ 7 DAYS | 156.0a | 203.0b-f |
| 20 OR-009-K | 0.4% v/v | 150 GAL/AC 2 @ 7 DAYS | 97.0a | 115.3def |
| LSD P = .05 | | | 115.38-151.05 | 179.58-330.06 |
| Standard Deviation | | | 3.86t | 5.31t |
| CV | | | 32.43t | 36.37t |
| Levene's F | | | 0.797 | 1.258 |
| Levene's Prob(F) | | | 0.708 | 0.241 |
| Skewness | | | 0.6649* | 0.5943* |
| Kurtosis | | | 0.046 | 0.1895 |
| Replicate F | | | 4.064 | 3.418 |
| Replicate Prob(F) | | | 0.0107 | 0.0229 |
| Treatment F | | | 1.356 | 2.671 |
| Treatment Prob(F) | | | 0.1815 | 0.0018 |

Conclusions and considerations during the trials—At initiation of the trial, the spider mite population was very active with most plots averaging ~250-350 motiles. At 6 DA-A, all treatments experienced a decrease in total motiles, including the untreated check. By the next evaluation at 3 DA-B, the mite population began to increase. Treatments with Abacus (the local standard), were the top performing treatments at this point in the trial. At the final evaluation at 13 DA-B, both nymph and adult populations surged, particularly within the untreated plots. Despite the increased pressure, treatment #20 (OR-295 @ 0.4% v/v) was one of the best retained approximately 80% control.

Conclusion a) The results of these greenhouse tests showed that OR-296-A and OR-009-K is very effective in control of adults and nymphs of Two-spotted spider mite, performing similar and sometimes slightly better than both comparative treatments ABACUS™ and PREV-AM®. OR-009-K at 0.4% v/v is slightly better than OR-296-A even in the higher dosage, mainly in control of nymphs.

Conclusion c) The results of these greenhouse tests showed that both OR-296-A and OR-009-K are very promising in control of nymphs and adults of Two-spotted spider mite, and considering that this innovative, human and environmental safe compositions performing similar or better than conventional prior arts, this invention shows high potential to be a safe option to the agricultural market.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A liquid anti-pathogenic agricultural composition for use in controlling pathogens and/or in treating diseases caused by said pathogens, the liquid anti-pathogenic agricultural composition consisting of:

5 wt. % to 7 wt. % of isopropyl myristate, 3 wt. % to 18 wt. % of sodium dodecyl benzene sulfonate and sodium lauryl ether sulfate, 9 wt. % to 12 wt. % of alcohol ethoxylated 6 POE, 30 wt. % to 65 wt. % of water and/or compounds selected from the group consisting of preservatives, clarifiers, anti-freezing agents, hydrotropes, stabilizers, antioxidants, dyes, rheology modifiers, anti-foaming agents, anti-drift agents and combinations thereof, wherein the liquid agricultural anti-pathogenic composition has a flash point higher than 100° C.

2. A method of diluting a liquid anti-pathogenic agricultural composition, comprising:

diluting the liquid anti-pathogenic agricultural composition according to claim 1 with water at a ratio by weight of the liquid anti-pathogenic agricultural composition to water 1:5000 to 1:10 to yield a stable diluted emulsion and/or microemulsion.

3. The method of claim 2, wherein the water further comprises at least one agricultural compound selected from the group consisting of adjuvants, insecticides, fungicides, acaricides, nutrients, miticides, bactericides, biocides, ovicides, nematicides, insect growth regulators, plant growth regulators, and combinations thereof.

4. The method of claim 2, wherein the liquid anti-pathogenic agricultural composition is diluted in a mixing tank, a spray tank, a container, or an inline irrigation system.

5. The method of claim 4, wherein the diluted liquid anti-pathogenic agricultural composition is applied on at least one selected from the group consisting of plants, weeds, seeds, soil, urban places, and forests, via an apparatus selected from the group consisting of air assisted sprayers, sprayers, ultra-low volume equipment, chemigation systems, pivots, sprinklers, and combinations thereof.

* * * * *